United States Patent
Su et al.

(10) Patent No.: US 12,149,753 B2
(45) Date of Patent: Nov. 19, 2024

(54) ITERATIVE OPTIMIZATION OF RESHAPING FUNCTIONS IN SINGLE-LAYER HDR IMAGE CODEC

(71) Applicant: DOLBY LABORATORIES LICENSING CORPORATION, San Francisco, CA (US)

(72) Inventors: Guan-Ming Su, Fremont, CA (US); Harshad Kadu, Santa Clara, CA (US)

(73) Assignee: DOLBY LABORATORIES LICENSING CORPORATION, San Francisco, CA (US)

( * ) Notice: Subject to any disclaimer, the term of this patent is extended or adjusted under 35 U.S.C. 154(b) by 21 days.

(21) Appl. No.: 17/920,391

(22) PCT Filed: Apr. 21, 2021

(86) PCT No.: PCT/US2021/028475
§ 371 (c)(1),
(2) Date: Oct. 20, 2022

(87) PCT Pub. No.: WO2021/216767
PCT Pub. Date: Oct. 28, 2021

(65) Prior Publication Data
US 2023/0164366 A1 May 25, 2023

Related U.S. Application Data

(60) Provisional application No. 63/013,807, filed on Apr. 22, 2020.

(30) Foreign Application Priority Data

Apr. 22, 2020 (EP) .................................... 20170837

(51) Int. Cl.
*H04N 19/98* (2014.01)
*G06T 5/90* (2024.01)
(Continued)

(52) U.S. Cl.
CPC ............... *H04N 19/98* (2014.11); *G06T 5/90* (2024.01); *H04N 19/186* (2014.11); *H04N 23/741* (2023.01); *G06T 2207/20208* (2013.01)

(58) Field of Classification Search
CPC ........ H04N 19/98; H04N 19/186; G06T 5/90; G06T 2207/20208
(Continued)

(56) References Cited

U.S. PATENT DOCUMENTS 9,648,351 B2   5/2017   Su
9,716,887 B2   7/2017   Atkins
(Continued)

FOREIGN PATENT DOCUMENTS

KR   20190086053 A   7/2019
RU   2666234 C1       9/2018
(Continued)

OTHER PUBLICATIONS

Methods for conversion of high dynamic range content to standard dynamic range content and vice-versa, BT Series Broadcasting service (television), Report ITU-R BT.2446-0, Apr. 2019, 33 pages.

*Primary Examiner* — Ayman A Abaza

(57) ABSTRACT

A method, for generating (a) a forward reshaping function for compressing an input high-dynamic range (HDR) image into a reshaped standard-dynamic-range (SDR) image and (b) a backward reshaping function for decompressing the reshaped SDR image into a reconstructed HDR image, includes (i) optimizing the forward reshaping function to minimize a deviation between the reshaped SDR image and an input SDR image corresponding to the input HDR image, (ii) optimizing the backward reshaping function to minimize a deviation between the reconstructed HDR image and the input HDR image, and (iii) until a termination condition is met, applying a correction to the input SDR image and reiterating, based on the input SDR image as corrected, the (Continued)

steps of optimizing the forward and backward reshaping functions.

15 Claims, 16 Drawing Sheets

(51) Int. Cl.
*H04N 19/186* (2014.01)
*H04N 23/741* (2023.01)

(58) Field of Classification Search
USPC .................................................. 375/240.01
See application file for complete search history.

(56) References Cited

U.S. PATENT DOCUMENTS

| | | | |
|---|---|---|---|
| 10,080,026 B2 | 9/2018 | Su | |
| 10,223,774 B2 | 3/2019 | Kadu | |
| 10,244,244 B2 | 3/2019 | Piramanayagam | |
| 10,264,287 B2 | 4/2019 | Wen | |
| 11,257,195 B2 * | 2/2022 | Andrivon | ............... H04N 19/98 |
| 2014/0029675 A1 | 1/2014 | Su | |
| 2017/0308996 A1 | 10/2017 | Kadu | |
| 2018/0007356 A1 | 1/2018 | Kadu | |
| 2018/0242006 A1 | 8/2018 | Kerofsky | |
| 2018/0278967 A1 | 9/2018 | Kerofsky | |
| 2018/0309995 A1 | 10/2018 | He | |
| 2019/0110054 A1 * | 4/2019 | Su | ........................ H04N 19/154 |
| 2019/0164262 A1 * | 5/2019 | Cellier | ...................... G06T 5/92 |
| 2019/0208173 A1 | 7/2019 | Kadu | |
| 2019/0222866 A1 | 7/2019 | Song | |
| 2019/0281325 A1 | 9/2019 | Song | |
| 2019/0349607 A1 * | 11/2019 | Kadu | ................... H04N 19/177 |
| 2021/0183028 A1 * | 6/2021 | Cellier | .................. H04N 19/85 |
| 2022/0408081 A1 | 12/2022 | Su | |

FOREIGN PATENT DOCUMENTS

| | | | |
|---|---|---|---|
| RU | 2687267 C2 | 1/2019 | |
| WO | 2014204865 A1 | 12/2014 | |
| WO | 2016153896 A1 | 9/2016 | |
| WO | 2017024042 A2 | 2/2017 | |
| WO | 2017157977 A1 | 9/2017 | |
| WO | WO-2018202744 A1 * | 11/2018 | ............. G06T 5/009 |
| WO | 2018231968 A1 | 12/2018 | |
| WO | 2019160986 A1 | 8/2019 | |
| WO | 2019217751 A1 | 11/2019 | |

* cited by examiner

ITERATIVE OPTIMIZATION OF RESHAPING FUNCTIONS IN SINGLE-LAYER HDR IMAGE CODEC

CROSS-REFERENCE TO RELATED APPLICATIONS

This application claims priority to U.S. Provisional Application No. 63/013,807 and European Patent Application No. 20170837.7, both filed on Apr. 22, 2020, each of which is incorporated by reference in its entirety.

TECHNICAL FIELD

The present application relates to high-dynamic-range images, more particularly encoding of high-dynamic-range images at a standard dynamic range in a manner that enables subsequent reconstruction of the high-dynamic-range images from the standard-dynamic-range data.

BACKGROUND

Historically, most digital imagery, such as digital movies, has been created at a bit depth of 8 bits. This bit depth however presents a challenging tradeoff between contrast and resolution, as this bit depth is inferior to the human visual system. If a high dynamic range between brightest and darkest pixels is encoded at a bit depth of 8 bits, the discrete steps between adjacent pixel values on the brightness scale may be perceptible to a viewer. For example, a scene portion that has only a very gradual brightness variation may appear striped. If, on the other hand, the discrete steps between pixel values are set to a value that is imperceptible by a human, the dynamic range will be limited to less than the dynamic range of the human visual system. To overcome these issues and further enhance the viewing experience, digital imagery is now often created with a greater bit depth, such as 10 or 12 bits, to produce high-dynamic-range (HDR) content. To ensure compatibility with a variety of viewing devices, digital imagery is often provided at both the standard bit depth of 8 bits and a higher bit depth, such as 10 or 12 bits.

The relaying of digital imagery to a viewing system typically involves a codec. First, the imagery is encoded as data in a desired data format. The encoded data may include both image data and metadata. After communicating the data via a communication link to the viewing system, the data is decoded by the viewing system to reconstruct and display the imagery. Even when relaying HDR content, the communication link is often limited to the standard bit depth of 8 bits. Thus, some HDR codecs are configured to (a) in the encoding, compress the HDR imagery to a bit depth of 8 bits, and (b) in the decoding, decompress the compressed data to at least approximately reconstruct the HDR imagery. Furthermore, since not all viewing systems are capable of decoding and displaying HDR imagery, a dual-layer codec may be used to provide both standard-dynamic-range (SDR) imagery and HDR imagery. However, in some scenarios, a single-layer codec is preferred, wherein a single image data set is communicated to a decoder of a viewing system whereafter, depending on the properties of the viewing system, the image data set may be decoded to generate SDR imagery or HDR imagery.

In the single-layer codec, the encoding may utilize a forward reshaping function to generate reshaped SDR image data from input HDR image data, and the decoding may utilize a backward reshaping function to at least approximately reconstruct the input HDR image data from the reshaped SDR image data. The backward reshaping function is relayed from the encoder to the decoder as metadata accompanying the reshaped SDR image data. If the viewing system is not configured to process HDR image data, the decoder may forego using the backward reshaping function and instead directly use the reshaped SDR image data to generate SDR imagery. The quality of the reconstructed HDR image data is at least in part determined by the quality of the forward and backward reshaping functions.

Conventionally, for an input SDR and HDR image pair, the forward reshaping function is optimized to minimize the difference between the reshaped SDR image and the input SDR image, and the backward reshaping function is optimized to minimize the difference between the reconstructed HDR image and the input HDR image, with the only adjustable optimization parameters being properties of the forward and backward reshaping functions.

SUMMARY

Disclosed herein are methods, software products, and devices that utilize an iterative optimization process to determine forward and backward reshaping functions in a single-layer high-dynamic-range codec. Conventionally, for an input standard-dynamic-range (SDR) and high-dynamic-range (HDR) image pair, the forward reshaping function is optimized to minimize the difference between the reshaped SDR image and the input SDR image, and the backward reshaping function is optimized to minimize the difference between the reconstructed HDR image and the input HDR image, with the only adjustable optimization parameters being properties of the forward and backward reshaping functions. The processing required to optimize the properties of these conventionally determined forward and backward reshaping function to a high quality may require a substantial amount of computation, which is unfeasible in some potential application scenarios. Instead of adjusting only properties of the reshaping functions, the present iterative optimization process iteratively evaluates an optimization error and feeds this error backwards as a correction to the input SDR image. This iterative process with backwards error propagation to the input SDR image simplifies the optimization of the reshaping functions, and may thus improve the performance of the reshaping functions and/or make the associated codec suitable for a wider range of applications.

In an embodiment, a method, for generating (a) a forward reshaping function for compressing an input high-dynamic range (HDR) image into a reshaped standard-dynamic-range (SDR) image and (b) a backward reshaping function for decompressing the reshaped SDR image into a reconstructed HDR image, includes (i) optimizing the forward reshaping function to minimize a deviation between the reshaped SDR image and an input SDR image corresponding to the input HDR image, (ii) optimizing the backward reshaping function to minimize a deviation between the reconstructed HDR image and the input HDR image, and (iii) until a termination condition is met, applying a correction to the input SDR image and reiterating, based on the input SDR image as corrected, the steps of optimizing the forward and backward reshaping functions.

In an embodiment, a software product, for generating (a) a forward reshaping function for compressing an input high-dynamic range (HDR) image into a reshaped standard-dynamic-range (SDR) image and (b) a backward reshaping function for decompressing the reshaped SDR image into a reconstructed HDR image, includes non-transitory, computer-readable media storing machine-readable instructions. The instructions include (i) forward optimization instructions that, when executed by a processor, cause the processor to optimize the forward reshaping function to minimize deviation between the reshaped SDR image and an input SDR image corresponding to the input HDR image, (ii) backward optimization instructions that, when executed by the processor, cause the processor to optimize the backward reshaping function to minimize deviation between the reconstructed HDR image and the input HDR image, (iii) SDR-image correction instructions that, when executed by the processor, cause the processor to apply a correction to the input SDR image, and (iv) iteration control instructions that, when executed by the processor, cause the processor to evaluate if a termination condition has been met and, as long as the termination condition has not been met, execute the SDR image correction instructions and re-execute the forward optimization instructions and the backward optimization instructions based on the input SDR image as corrected.

DESCRIPTION OF EXAMPLE EMBODIMENTS

Figure 1:
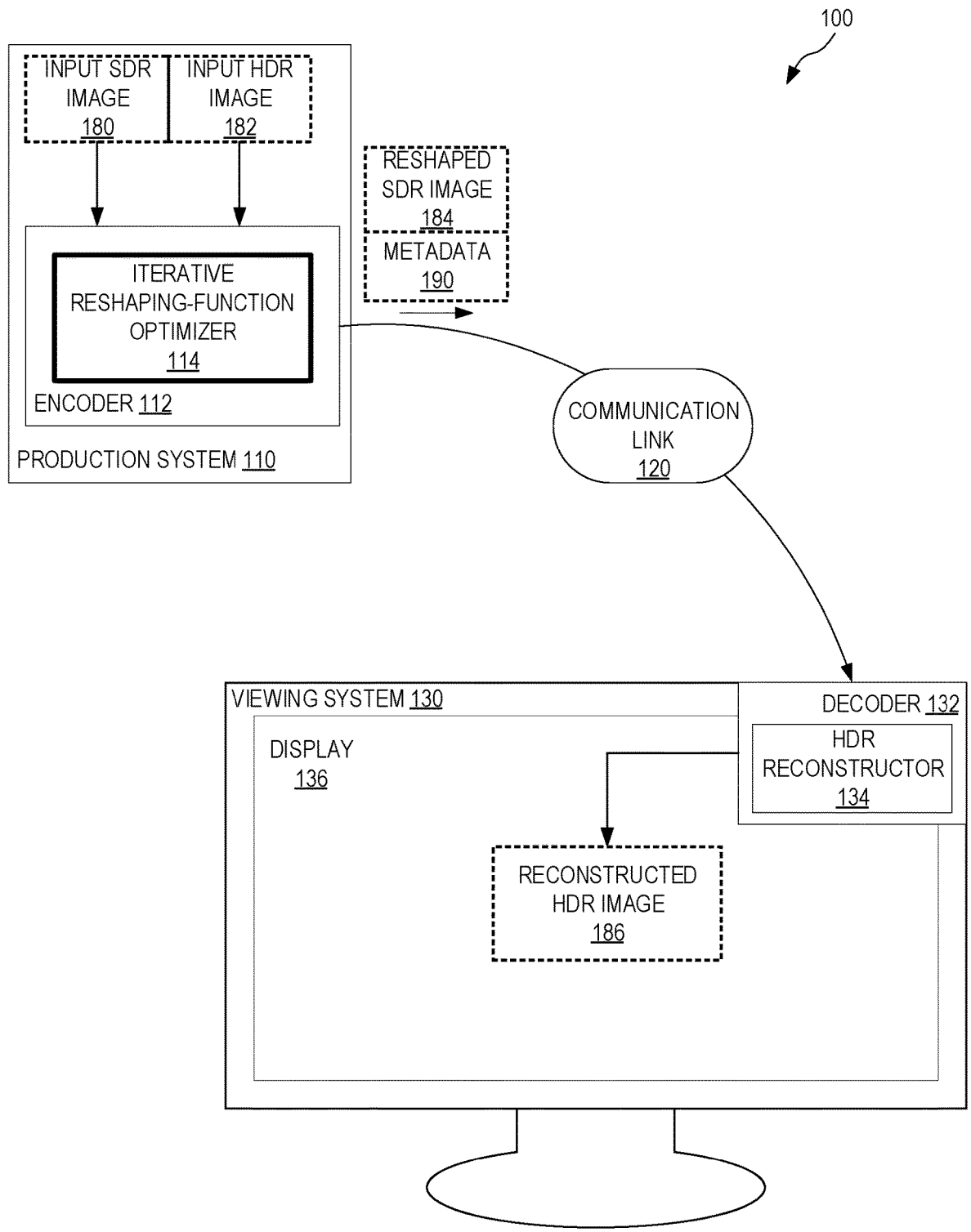
FIG. 1 illustrates an embodiment of a single-layer high-dynamic-range (HDR) image codec in an example use scenario.

FIG. 1 illustrates one single-layer high-dynamic-range (HDR) image codec 100 in an example use scenario. In this use scenario, standard-dynamic-range (SDR) and HDR versions of the same imagery is relayed from a production system 110 to an HDR-enabled viewing system 130 via a communication link 120. Production system 110 includes an encoder 112. Viewing system 130 includes a decoder 132 and a display 136. Codec 100 includes an iterative reshaping-function optimizer 114 and an HDR reconstructor 134. Display 136 is not part of codec 100 but relies on codec 100. Iterative reshaping-function optimizer 114 is implemented in encoder 112, and HDR reconstructor 134 is implemented in decoder 132.

In operation, production system 110 generates or receives an input SDR image 180 and an input HDR image 182, representing two different versions of the same imagery. In another scenario, input SDR image 180 represents original image content, and input HDR image 182 is produced from input SDR image 180 as an HDR-compatible, and possibly enhanced, version of input SDR image 180. Encoder 112 runs iterative reshaping-function optimizer 114 to process input SDR image 180 and input HDR image 182 to optimize forward and backward reshaping functions. Based on these optimized reshaping functions, encoder 112 generates a reshaped SDR image 184 together with metadata 190. Metadata 190 encodes at least a specification of an optimized backward reshaping function to be used by HDR reconstructor 134 of decoder 132.

Production system 110 relays reshaped SDR image 184 and metadata 190 to viewing system 130 via communication link 120. Communication link 120 may be limited to a bit-depth that does not allow for direction transmission of HDR imagery at its native bit depth. In one example, communication link 120 includes one or more interfaces and/or storage media limited to 8 bits, or 10 bits. Communication link 120 may include one or more wireless or wired transmission paths, for example such as used in movie streaming. Alternatively, communication link 120 may utilize a physical storage medium such as a DVD or blu-ray disc. Viewing system 130 may be a television with decoder 132 built in, a television (or other display) coupled with a DVD/blu-ray player with decoder 132 incorporated in the DVD/blu-ray player, or a computer (e.g., desktop, laptop, smartphone, or tablet) with decoder 132 built in.

After receiving reshaped SDR image 184 and metadata 190, decoder 132 runs HDR reconstructor 134 to generate reconstructed HDR image 186 by applying to reshaped SDR image 184 a backward reshaping function specified by metadata 190. Viewing system 130 may then display reconstructed HDR image 186 on display 136.

If, in an alternative use scenario, a non-HDR-enabled viewing system receives reshaped SDR image 184 and metadata 190, this non-HDR-enabled viewing system may ignore the backward-reshaping-function specification included in metadata 190 and instead either display reshaped SDR image 184 as is, or display an SDR image that is generated from reshaped SDR image 184.

Iterative reshaping-function optimizer 114 is configured to perform an iterative process to determine the forward and backward reshaping functions. In each iteration, iterative reshaping-function optimizer 114 optimizes (a) the forward reshaping function to minimize a deviation between reshaped SDR image 184 and input SDR image 180, and (b) the backward reshaping function to minimize a deviation between reconstructed HDR image 186 and input HDR image 182. Where optimization process of a conventional single-layer HDR codec relies exclusively on adjusting properties of the forward and backward reshaping functions, iterative reshaping-function optimizer 114 utilizes a backwards error propagation to input SDR image 180. More specifically, until a termination condition is met, iterative reshaping-function optimizer 114 keeps correcting SDR input image 180 and reiterating the optimization of the forward and backward reshaping functions based on the corrected version of SDR input image 180. This iterative process with backwards error propagation to input SDR image 180 relieves complexity of the individual iterations of optimizing the reshaping functions, and may improve the performance of the resulting reshaping functions as well as make codec 100 suitable for a wider range of applications than conventional single-layer HDR codecs.

Encoder 112 may include a processor and a non-transitory memory, wherein iterative reshaping-function optimizer 114 is implemented as software stored in the non-transitory memory. This software may be provided as a standalone product to be implemented together with a third-party processor, e.g., on a third-party computer that is part of a production system.

Figure 2:
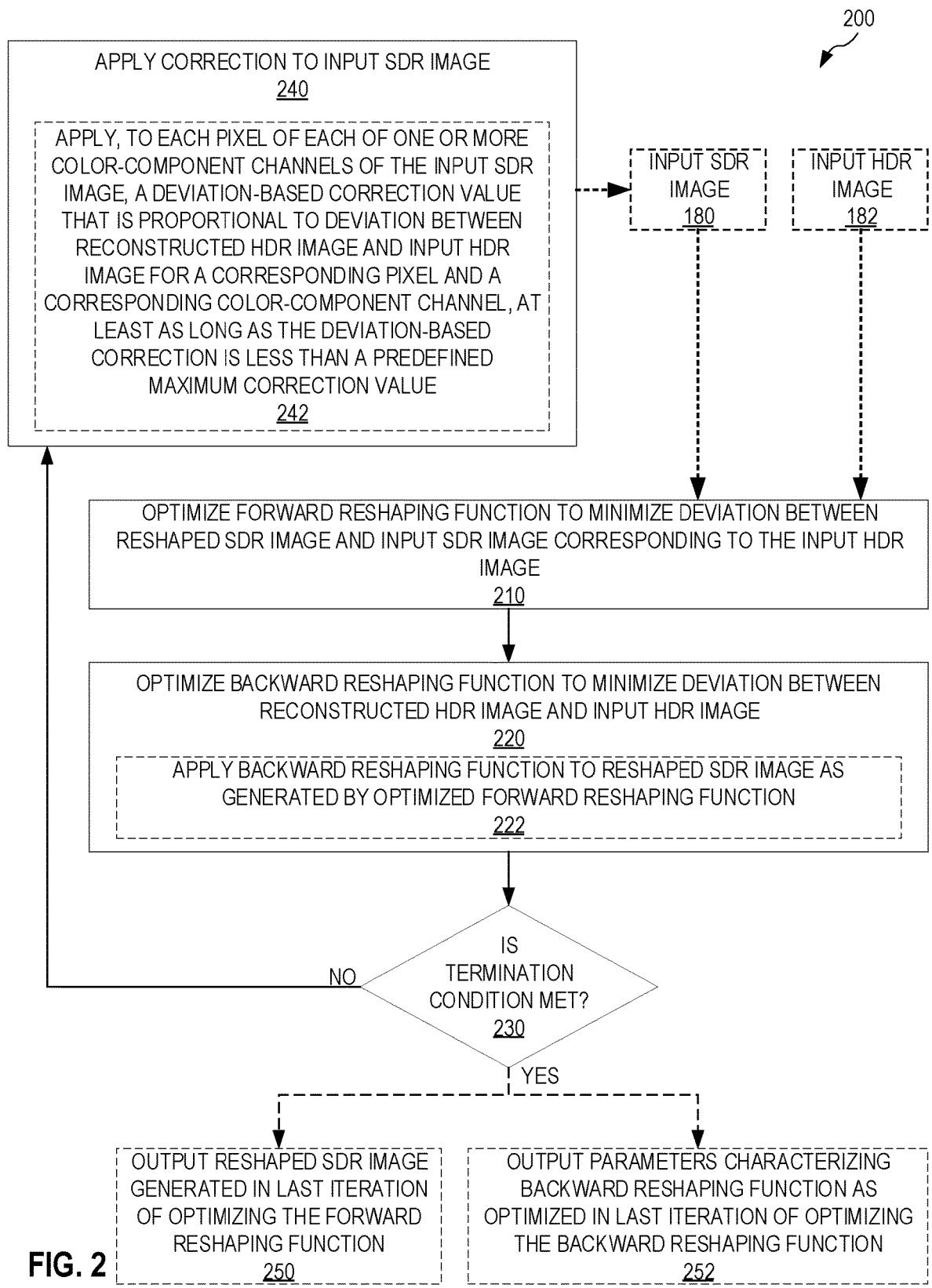
FIG. 2 illustrates a method for generating (a) a forward reshaping function for compressing an input HDR image into a reshaped standard-dynamic-range (SDR) image and (b) a backward reshaping function for decompressing the reshaped SDR image into a reconstructed HDR image, according to an embodiment.

FIG. 2 illustrates one method 200 for generating (a) a forward reshaping function for compressing an input HDR image into a reshaped SDR image and (b) a backward reshaping function for decompressing the reshaped SDR image into a reconstructed HDR image. Method 200 takes input SDR image 180 and input HDR image 182 as input. Method 200 utilizes iterative optimization of reshaping functions with backwards error propagation to input SDR image 180, and is configured for use in a single-layer HDR image codec. Iterative reshaping-function optimizer 114 may implement method 200 to process input SDR image 180 and input HDR image 182, so as to generate reshaped SDR image 184 and a portion of metadata 190 specifying a backward reshaping function. Method 200 includes several iterations of steps 210, 220, 230, and 240.

In each iteration, step 210 optimizes the forward reshaping function to minimize deviation between reshaped SDR image 184 and input SDR image 180, and step 220 optimizes the backward reshaping function to minimize deviation between reconstructed HDR image 186 and input HDR image 182. Each of steps 210 and 220 may utilize a variety of optimization methods, for example multivariate multiple regression (MMR), tensor product b-spline (TPBS) approximation, or other optimization methods known in the art. Step 220 may implement a step 222 of applying the backward reshaping function to reshaped SDR image 184 as generated by the forward reshaping function optimized in step 210 of the same iteration. In one example of step 210, iterative reshaping-function optimizer 114 receives input SDR image 180 and input HDR image 182, optimizes the forward reshaping function to minimize deviation between (a) input SDR image 180 and (b) reshaped SDR image 184 as generated by applying the forward reshaping function to input HDR image 182. In a related example of step 220, iterative reshaping-function optimizer 114 processes input HDR image 182 and reshaped SDR image 184 (as generated by the applying the optimized forward reshaping function to input SDR image 180). In this processing, iterative reshaping-function optimizer 114 optimizes the backward reshaping function to minimize deviation between (a) input HDR image 182 and (b) reconstructed HDR image 186 as generated by applying the backward reshaping function to reshaped SDR image 184.

Step 230 is a decision step, performed after steps 210 and 220, that evaluates if a termination condition is met. If the termination condition is not met, method 200 proceeds to step 240. If the termination condition is met, method 200 may proceed to perform one or both of steps 250 and 252. Step 230 may be performed by iterative reshaping-function optimizer 114. In one embodiment, the termination condition is that a deviation measure (hereafter referred to as the HDR-only deviation measure) between reconstructed HDR image 186 and input HDR image 182 is no greater than a threshold amount. In another embodiment, the termination condition is that a composite deviation measure is met, wherein the composite deviation measure is a weighted combination of (i) the deviation between reconstructed HDR image 186 and input HDR image 182 and (ii) the deviation between reshaped SDR image 184 and input SDR image 180. Either of these two embodiments may be extended to further place a limit on the number of iterations, such that the termination condition is met when either one of the following two situations occurs: (1) the deviation measure (HDR-only or composite) is no greater than an associated threshold amount, and (2) a predefined maximum number of iterations have been performed.

Input SDR image 180 and input HDR image 182 may be color images having a plurality of color-component channels. In one embodiment pertaining to color images, the deviation measure (e.g., either one of the HDR-only deviation measure and the composite deviation measure) is based on all of the plurality of color-component channels. In another embodiment pertaining to color images, the deviation measure is based on only a subset of the plurality of color-component channels. For example, when the color-component channels are a luma channel, a first chroma channel, and a second chroma channel, the deviation measure may be based on the only luma channel such that the luma channel is used as a guide for the iterative process, deviation measure may be based on only the chroma channels such that the chroma channels are used as guides for the iterative process. In another embodiment of method 200, pertaining to color images having a luma channel and two chroma channels, iterative optimization is applied to the chroma channels, whereas the forward and backward reshaping functions for the luma channel are optimized in only a single iteration of steps 210 and 220.

Step 240 applies a correction to input SDR image 180. In one example of step 240, iterative reshaping-function optimizer 114 applies a correction to input SDR image 180 before feeding input SDR image 180, as corrected, to a next iteration of steps 210, 220, and 240. In an embodiment, step 230 evaluates a deviation measure (such as the HDR-only deviation measure), and step 240 corrects input SDR image 180 by an amount that is a function of the deviation measure. For example, step 240 may correct input SDR image 180 by an amount that is proportional to the HDR-only deviation measure, optionally limited to less than a predefined maximum correction amount to prevent too large changes to the input SDR image. In an alternative example, step 240, the function relating the correction amount to the deviation measure is more complex in order to guide the iterative optimization in a desired manner. Step 240 may correct input SDR image 180 on a pixel-by-pixel basis, with each pixel of input SDR image 180 being corrected by an amount that depends on the deviation measure pertaining to that pixel.

Step 250 outputs the reshaped SDR image generated in a last iteration of step 210 using the forward reshaping function optimized in this iteration. In one example of step 250, iterative reshaping-function optimizer 114 outputs reshaped SDR image 184. Step 252 outputs one or more parameters characterizing the backward reshaping function as optimized in last iteration of step 220. In one example of step 252, iterative reshaping-function optimizer 114 outputs these one or more parameters as part of metadata 190.

Although not shown in FIG. 2, method 200 may include maintaining an uncorrected version of input SDR image 180. In such an embodiment, all corrections of input SDR image 180 in iterations of step 240 may be performed on a local copy of input SDR image 180.

When method 200 is utilizes to process a video, method 200 may be repeated for each frame of the video. Alternatively, method 200 may reoptimize the forward and backward reshaping function less frequently and, for example, use the same forward and backward reshaping functions for several successive frames.

Mathematical Description of One Embodiment of Method 200:

Here, notation is introduced for the purpose of discussing one embodiment of method 200 as applied to an input signal having t frames, wherein t is greater than or equal to one and each frame is represented by input SDR image 180 and input HDR image 182. Let $v_{t,i}^{ch}$ denote the $i^{th}$ pixel at t frame at ch channel for the input HDR signal. Let $s_{t,i}^{ch}$ denote the $i^{th}$ pixel at t frame at ch channel for the input SDR signal. For the $k^{th}$ iteration, let the $k^{th}$ iteration of the forward reshaping function be denoted as $FR_t^{ch,(k)}$ ( ), let the $k^{th}$ iteration of a parameter set used in $FR_t^{ch,(k)}$ ( ) be denoted as $FP_t^{ch,(k)}$, let the $k^{th}$ iteration of the backward reshaping function be denoted as $BR_t^{ch,(k)}$ ( ) let the $k^{th}$ iteration of a parameter set used in $BR_t^{ch,(k)}$ ( ) be denoted as $BP_t^{ch,(k)}$ let $\hat{s}_{t,i}^{ch,(k)}$ denote the $i^{th}$ pixel at t frame at ch channel for the reshaped SDR signal, let $\hat{v}_{t,i}^{ch,(k)}$ denote the $i^{th}$ pixel at t frame at ch channel for the reconstructed HDR signal, and let $\tilde{s}_{t,i}^{ch,(k)}$ denote the $i^{th}$ pixel at t frame at ch channel for the corrected input SDR signal.

At the first iteration (k=0), this embodiment of method 200 sets the corrected input SDR signal as the original input SDR signal, i.e., $$\tilde{s}_{t,i}^{ch,(0)} = s_{t,i}^{ch}.$$

In each iteration k of this embodiment of method 200, step 210 finds the parameters $FP_t^{ch,(k)}$ of the forward reshaping function that minimize the difference between the reshaped SDR signal and the corrected input SDR signal:

$$FP_t^{ch,(k)} = \arg\min \Sigma_i \|\tilde{s}_{t,i}^{ch,(k)} - \hat{s}_{t,i}^{ch,(k)}\|^2 = \arg\min \Sigma_i \|\tilde{s}_{t,i}^{ch,(k)} - FR_t^{ch,(k)}(v_{t,i}^{ch})\|^2,$$

wherein $$\hat{s}_{t,i}^{ch,(k)} = FR_t^{ch,(k)}(v_{t,i}^{ch})$$

In each iteration k of this embodiment of method 200, step 210 finds the parameters, i.e., $BP_t^{ch,(k)}$, of the backward reshaping function that minimize the difference between reconstructed HDR signal and input HDR signal:

$$BP_t^{ch,(k)} = \operatorname{argmin}\sum_i \|v_{t,i}^{ch} - \hat{v}_{t,i}^{ch,(k)}\|^2 = \operatorname{argmin}\sum_i \|v_{t,i}^{ch} - BR_t^{ch,(k)}(\hat{s}_{t,i}^{ch,(k)})\|^2,$$

wherein $$\hat{v}_{t,i}^{ch,(k)} = BR_t^{ch,(k)}(\hat{s}_{t,i}^{ch,(k)})$$

At the end of each iteration k, based on the reshaped HDR signal and the input HDR signal, step 240 in this embodiment of method 200 determines the amount $\Delta\tilde{s}_{t,i}^{ch,(k)}$ by which to correct the input SDR signal $\tilde{s}_{t,i}^{ch,(k+1)}$ to be used in iteration k+1. This amount is a function of $\hat{v}_{t,i}^{ch,(k)}$ and $v_{t,i}^{ch}$:

$$\Delta\tilde{s}_{t,i}^{ch,(k)} = g(\hat{v}_{t,i}^{ch,(k)}, v_{t,i}^{ch}).$$

The g function may be a simple subtraction function $$\Delta\tilde{s}_{t,i}^{ch,(k)} = v_{t,i}^{ch} - \hat{v}_{t,i}^{ch,(k)},$$

optionally scaled by a correction-scaling factor and/or further incorporating additional consideration of a gradient of the backward reshaping function. Step 240 then sets the corrected input SDR signal for the next iteration as:

$$\tilde{s}_{t,i}^{ch,(k+1)} = \tilde{s}_{t,i}^{ch,(k)} + \Delta\tilde{s}_{t,i}^{ch,(k)}$$

This embodiment of method 200 defines deviation measures in HDR and SDR as $$D_v^{ch,(k)} = \sum_i \|v_{t,i}^{ch} - \hat{v}_{t,i}^{ch,(k)}\|^2,$$

and $$D_s^{ch,(k)} = \sum_i \|s_{t,i}^{ch} - \hat{s}_{t,i}^{ch,(k)}\|^2,$$

respectively. In this embodiment, step 230 continues iteration of method 200 until reaching either one of a pre-set maximum iteration count and the composite deviation measure being no greater than a threshold:

$$D^{ch,(k)} = w_v \cdot D_v^{ch,(k)} + w_s \cdot D_s^{ch,(k)} \leq \delta,$$

wherein $w_v$ and $w_s$ are combination weights. In one implementation, $w_v$ equals one and $w_s$ equals zero, such that the composite deviation measure collapses to an HDR-only deviation measure. In another implementation, combination weights $w_v$ and $w_s$ are set to define a desired tradeoff between HDR distortion and SDR distortion, as discussed in further detail below in "Example 1: Polynomial Reshaping Functions" which presents results obtained with method 200 in an example using 4th-order polynomial reshaping functions.

Figure 3:
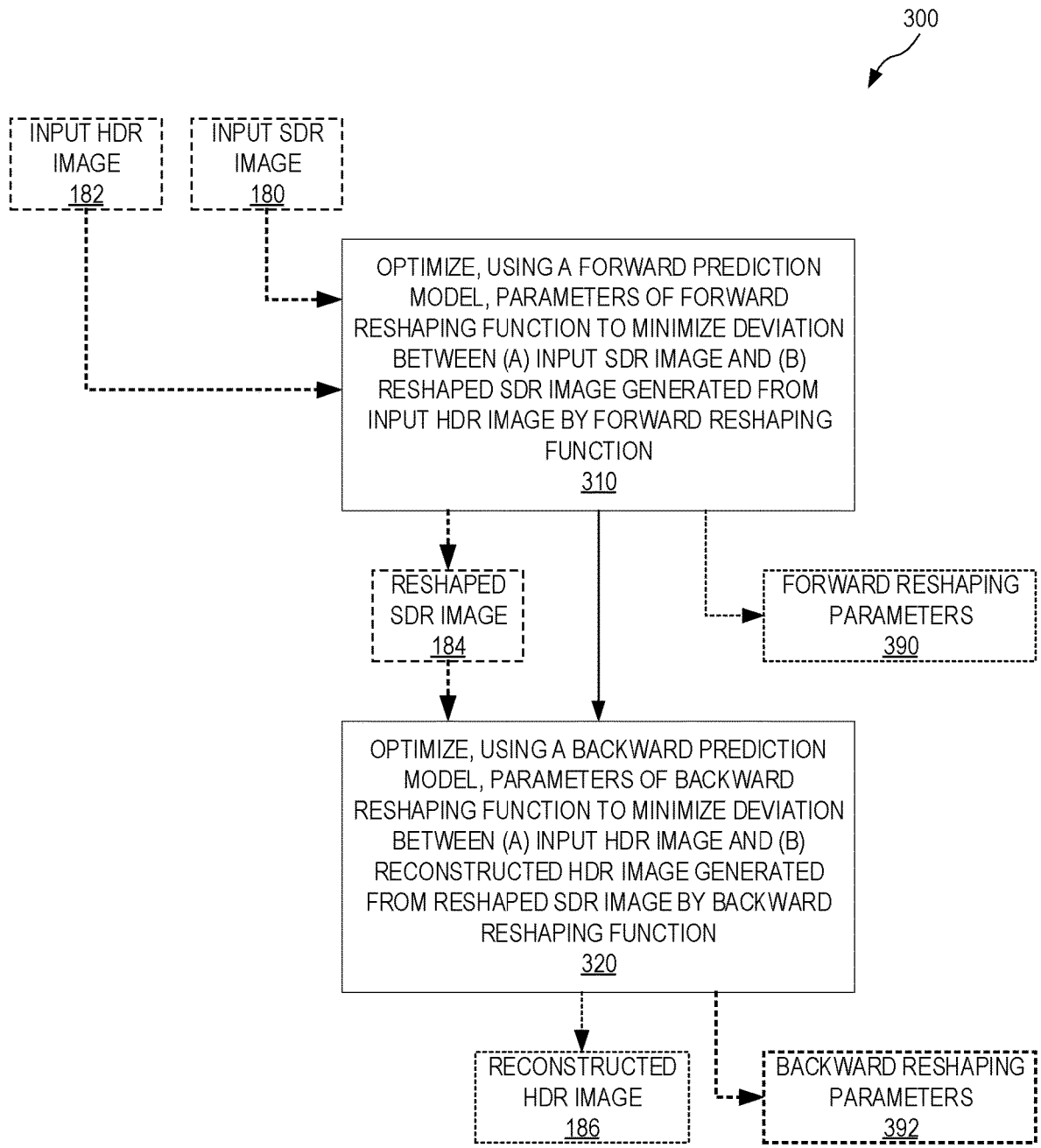
FIG. 3 illustrates a method for optimizing forward and backward reshaping functions, which may be implemented in each iteration of an iterative optimization of the reshaping functions with backwards error propagation to the input SDR image, according to an embodiment.

FIG. 3 illustrates one method 300 for optimizing forward and backward reshaping functions, which may be implemented in each iteration of an iterative optimization of the reshaping functions with backwards error propagation to the input SDR image. Method 300 is an embodiment of steps 210 and 220 of method 200, and may be performed by iterative reshaping-function optimizer 114. Method 300 includes steps 310 and 320, embodiments of steps 210 and 220, respectively. Step 310 uses a forward prediction model to optimize one or more parameters 390, e.g., $FP_t^{ch,(k)}$, of the forward reshaping function to minimize deviation between (a) input SDR image 180 and (b) reshaped SDR image 184 generated from input HDR image 182 by the forward reshaping function. Step 320 uses a backward prediction model to optimize one or more parameters 392, e.g., $BP_t^{ch,(k)}$, of the backward reshaping function to minimize deviation between (a) input HDR image 182 and (b) reconstructed HDR image 186 generated from reshaped SDR image 184 by the backward reshaping function.

In each of steps 310 and 320, the prediction model may incorporate MMR or TPBS approximation.

When method 300 is implemented in method 200, step 252 of method 200 (if included) may output parameter(s) 392. In one implementation, parameter(s) 390, generated in each iteration of step 310, are not used in any subsequent steps. In another embodiment, parameter(s) 390, generated in an iteration of step 310, may be used as a starting point for a subsequent iteration of step 310. The reconstructed HDR image 186 generated in each iteration of step 320 may be used in (a) step 230 to evaluate if the termination condition is met and (b) step 240 to determine the amount by which input SDR image 180 is corrected.

Figure 4:
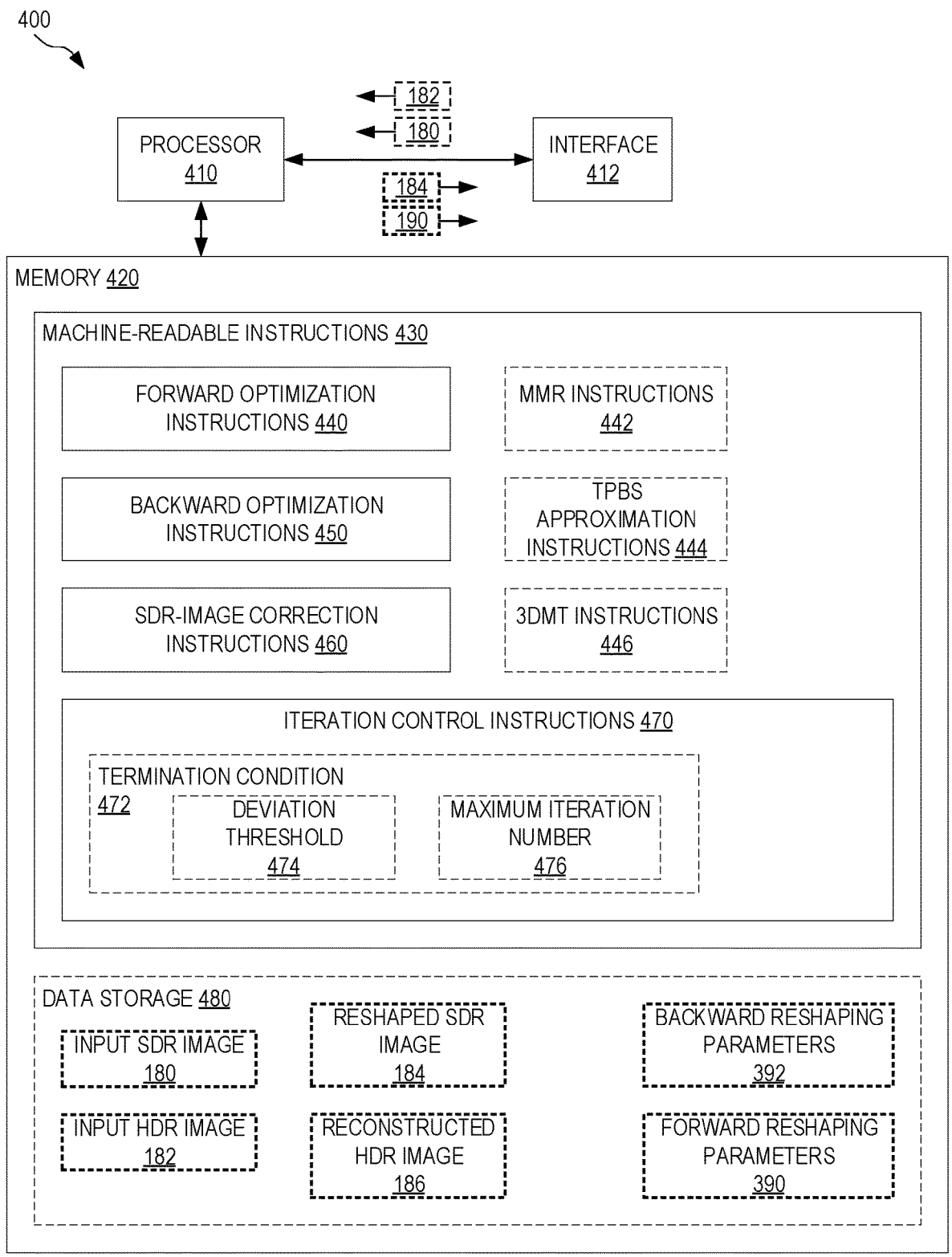
FIG. 4 illustrates an encoder for encoding an input SDR and HDR image pair in a single-layer HDR image codec, according to an embodiment.

FIG. 4 illustrates one encoder 400 for encoding an input SDR and HDR image pair in a single-layer HDR image codec. Encoder 400 is an embodiment of encoder 112 configured to perform method 200. Encoder 400 includes a processor 410, an interface 412, and a non-transitory, machine-readable memory 420. Memory 420 stores machine-readable instructions 430 that include forward optimization instructions 440, backward optimization instructions 450, SDR-image correction instructions 460, and iteration control instructions 470. Memory 420 may further include a data storage 480 configured to store images, parameters, and/or other data used by encoder 400.

Encoder 400 receives input SDR image 180 and input HDR image 182 via interface 412. Encoder 400 may store input SDR image 180 and input HDR image 182 in data storage 480. Once encoder 400 has performed method 200, encoder 400 may output reshaped SDR image 184 and metadata 190 via interface 412, wherein metadata 190 includes a specification of the backward reshaping function as optimized by encoder 400. Interface 412 may include both an input interface and an output interface.

Forward optimization instructions 440 are configured to, when executed by processor 410, control processor 410 to perform step 210 of method 200. To perform step 210, processor 410 may retrieve input SDR image 180 and input HDR image 182 from data storage 480, and store or update a resulting reshaped SDR image 184 in data storage 480. Processor 410 may further use data storage 480 for temporary storage of forward reshaping parameters 390 during their optimization in step 210.

Backward optimization instructions 450 are configured to, when executed by processor 410, control processor 410 to perform step 220 of method 200. To perform step 220, processor 410 may retrieve reshaped SDR image 184 and input HDR image 182 from data storage 480, and store or update resulting backward reshaping parameters 392 and reconstructed HDR image 186 to data storage 480.

Iteration control instructions 470 are configured to, when executed by processor 410, control processor 410 to perform step 230 of method 200. Iteration control instructions 470 may include a termination condition 472. When executing iteration control instructions 470, processor 410 may retrieve one or more of input HDR image 182, reconstructed HDR image 186, input SDR image 180, and reshaped SDR image 184 from data storage 480 to determine if termination condition 472 is met. Termination condition 472 may include a deviation threshold 474 (e.g., $\delta$). Termination condition 472 may also include a maximum iteration number 476.

SDR-image correction instructions 460 are configured to, when executed by processor 410, control processor 410 to perform step 240 of method 200. Processor 410 may retrieve input HDR image 182 and reconstructed HDR image 186 from data storage 480 to determine the amount by which input SDR image 180 is to be corrected, and then update input SDR image 180 in data storage 480.

Instructions 430 may further include one or both of MMR instructions 442 and TPBS instructions 444. MMR instructions 442 may be called by forward optimization instructions 440 and/or backward optimization instructions 450 to perform the associated optimization based on MMR. TPBS instructions 444 may be called by forward optimization instructions 440 and/or backward optimization instructions 450 to perform the associated optimization based on TPBS approximation.

Figure 5A:
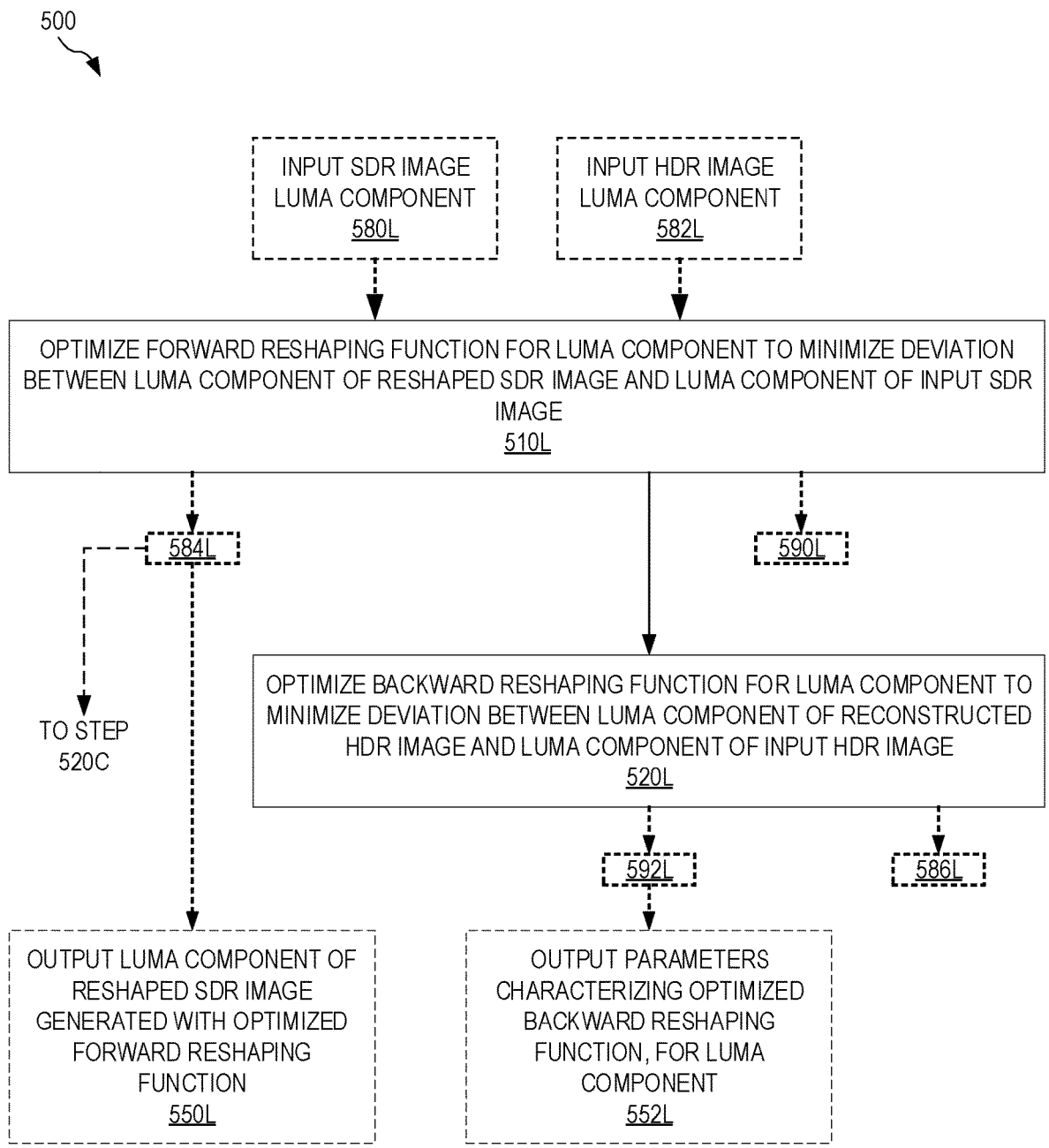
FIGS. 5A and 5B illustrate a method for generating forward and backward reshaping functions for color images with backwards error propagation only in the chroma channels, wherein each optimization iteration in the chroma channels utilizes multivariate multiple regression, according to an embodiment.
Figure 5B:
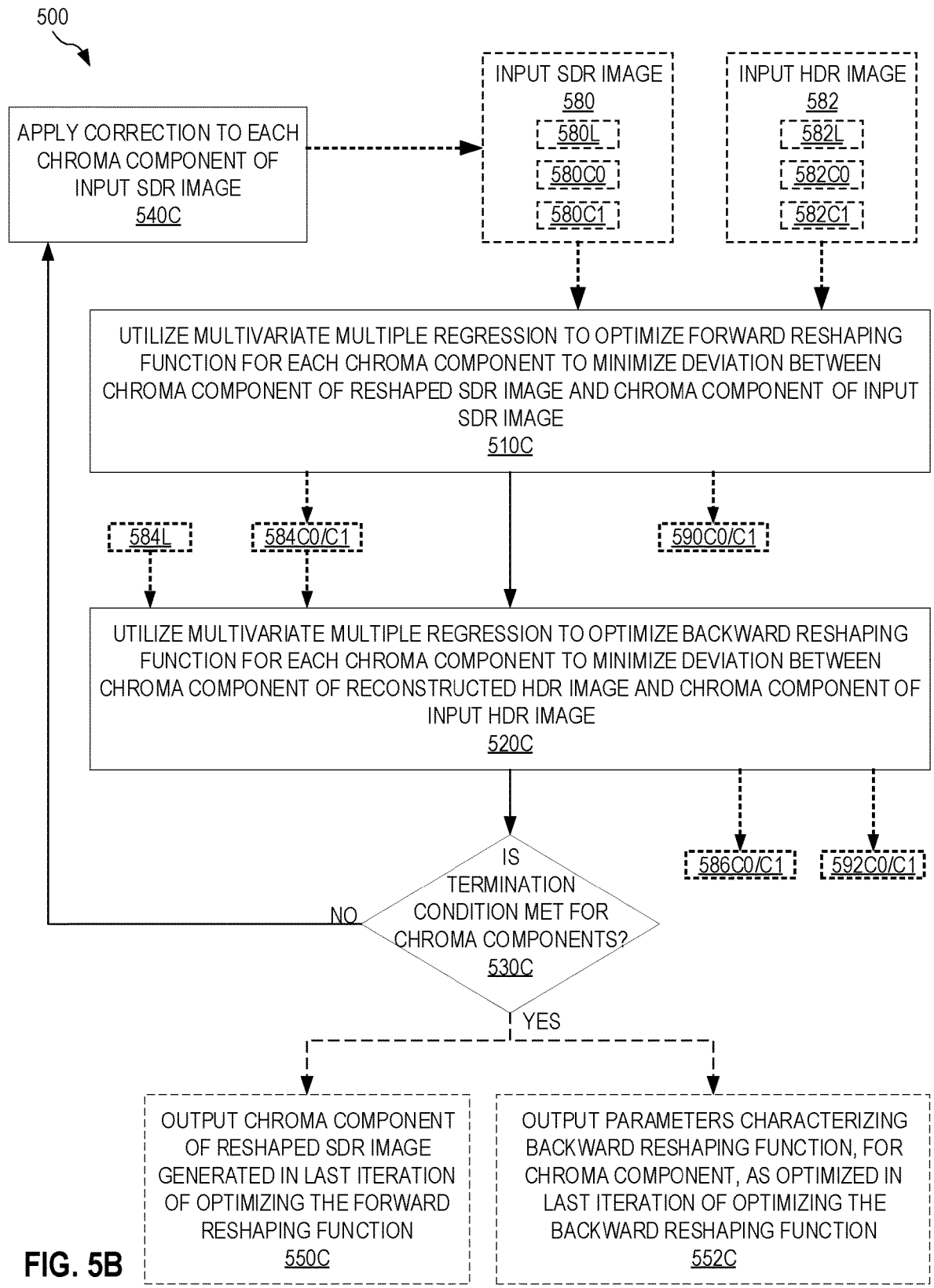

FIGS. 5A and 5B illustrate one method 500 for generating forward and backward reshaping functions for color images with backwards error propagation only in the chroma channels, wherein each optimization iteration in the chroma channels utilizes MMR. Method 500 is an embodiment of method 200 and may implement method 300. Method 500 may be performed by iterative reshaping-function optimizer 114, for example as implemented in encoder 400. FIG. 5A is a flowchart for generating the forward and backward reshaping functions for a luma component of an input SDR and HDR image pair. FIG. 5B is a flowchart for generating the forward and backward reshaping functions for each chroma component of the input SDR and HDR image pair.

For the luma component of a color-version of input SDR image 180 and input HDR image 182, method 500 includes steps 510L and 520L, luma-channel-specific embodiments of steps 210 and 220, respectively. For the luma channel, method 500 takes an input SDR image 580 and an input HDR image 582 as input. Input SDR image 580 and an input HDR image 582 are color images. Input SDR image 580 has a luma component, referred to as input SDR image luma component 580L, and two chroma components, referred to as input SDR image chroma components 580C0 and 580C1. Input HDR image 582 has a luma component, referred to as input HDR image luma component 582L, and two chroma components, referred to as input HDR image chroma components 582C0 and 582C1. Step 510L processes input SDR image luma component 580L and input HDR image luma component 582L. Step 510L optimizes a forward reshaping function, characterized by forward reshaping parameters 590L for the luma component, to minimize deviation between a reshaped SDR image luma component 584L and input SDR image luma component 580L. Step 520L optimizes the backward reshaping function, characterized by backward reshaping parameters 592L for the luma component, to minimize deviation between a reconstructed HDR image luma component 586L and input HDR image luma component 582L.

Once step 510L is completed, method 500 may perform a step 550L of outputting reshaped SDR image luma component 584L. Once step 520L is completed, method 500 may perform a step 552L of outputting backward reshaping parameters 592L for the luma component.

For the associated chroma channels, method 500 includes steps 510C, 520C, 530C, and 540C, chroma-specific embodiments of steps 210, 220, 230, and 240, respectively.

Step 510C utilizes MMR to optimize a forward reshaping functions, characterized by forward reshaping parameters 590C0 for the first chroma component and 590C1 for the second chroma component, to minimize (a) deviation between a reshaped SDR image chroma component 584C0 and input SDR image chroma component 580C0 and (b) deviation between a reshaped SDR image chroma component 584C1 and input SDR image chroma component 580C1. The MMR process of step 510C takes all color-components of input HDR image 582 as input to (a) predict both reshaped SDR chroma components 584C0 and 584C1 and (b) optimize the forward reshaping functions for the chroma channels characterized by respective forward reshaping parameters 590C0 and 590C1.

Next, step 520C utilizes MMR to optimize the backward reshaping functions, characterized by backward reshaping parameters 592C0 for the first chroma component and backward reshaping parameters 592C1 for the second chroma component, to minimize (a) deviation between a reconstructed HDR image chroma component 586C0 and input HDR image chroma component 582C0 and (b) deviation between a reconstructed HDR image chroma component 586C1 and input HDR image chroma component 582C1. As input to predict the reconstructed HDR chroma components and generate the backward reshaping functions for both chroma channels, the MMR process of step 520 takes reshaped SDR chroma components 584C0 and 584C1 (generated in step 510C of the same iteration) and reshaped SDR luma component 584L generated in step 510L.

Step 530C is a decision step that evaluates if a termination condition is met for the chroma components. If the termination condition is not met, method 500 proceeds to step 540C and a next iteration of steps 510C, 520C, and 530C. Step 540C applies a correction to one of both of input SDR image chroma components 580C0 and 580C1. Steps 530C and 540C are chroma-specific embodiments of steps 230 and 240, respectively. If step 530C finds that the termination condition is met, method 500 may perform steps 550C and 552C. Step 550C outputs reshaped SDR image chroma components 584C0 and 584C1 as generated in the last iteration of step 510C. Step 552C outputs backward reshaping parameters 592C0 and 590C1 for the chroma components, as optimized in last iteration of step 520C.

In one class of embodiments, optimization in steps 510C, 520C, 510L, and 520L is based on individual pixels of the involved images. One such embodiment is discussed below in reference to FIGS. 6A and 6B. In another class of embodiments, optimization in steps 510C, 520C, 510L, and 520L is based on three-dimensional (3D) bins of quantized values of the involved images. In these embodiment, reshaped SDR image chroma component 584C, reshaped SDR image luma component 584L, reconstructed HDR image chroma component 586C, and reconstructed HDR image luma component 586C may, at least during some or all of processing by method 500, be represented in their 3D bin representation rather than in their more convention pixel representation. Likewise, reshaping parameters 590C, 592C, 590L, and 592L may pertain to 3D bins instead of individual pixels. One 3D-bin based embodiment of method 500 is discussed below in reference to FIGS. 7A and 7B. 3D bins are also discussed in further detail below in reference to FIGS. 7A and 7B.

Figure 6A:
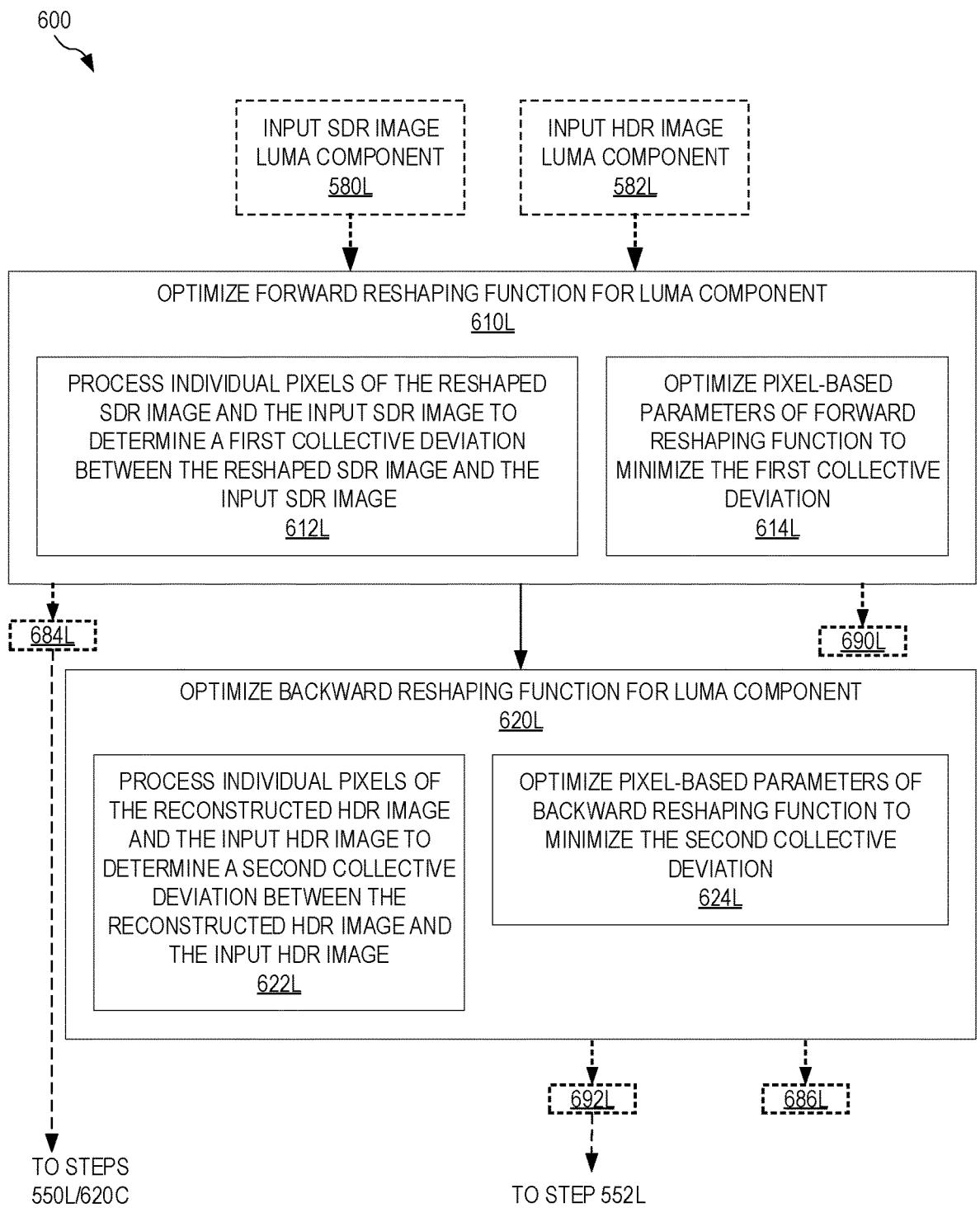
FIGS. 6A and 6B illustrate an embodiment of the method of FIGS. 5A and 5B based on pixel-by-pixel processing.
Figure 6B:
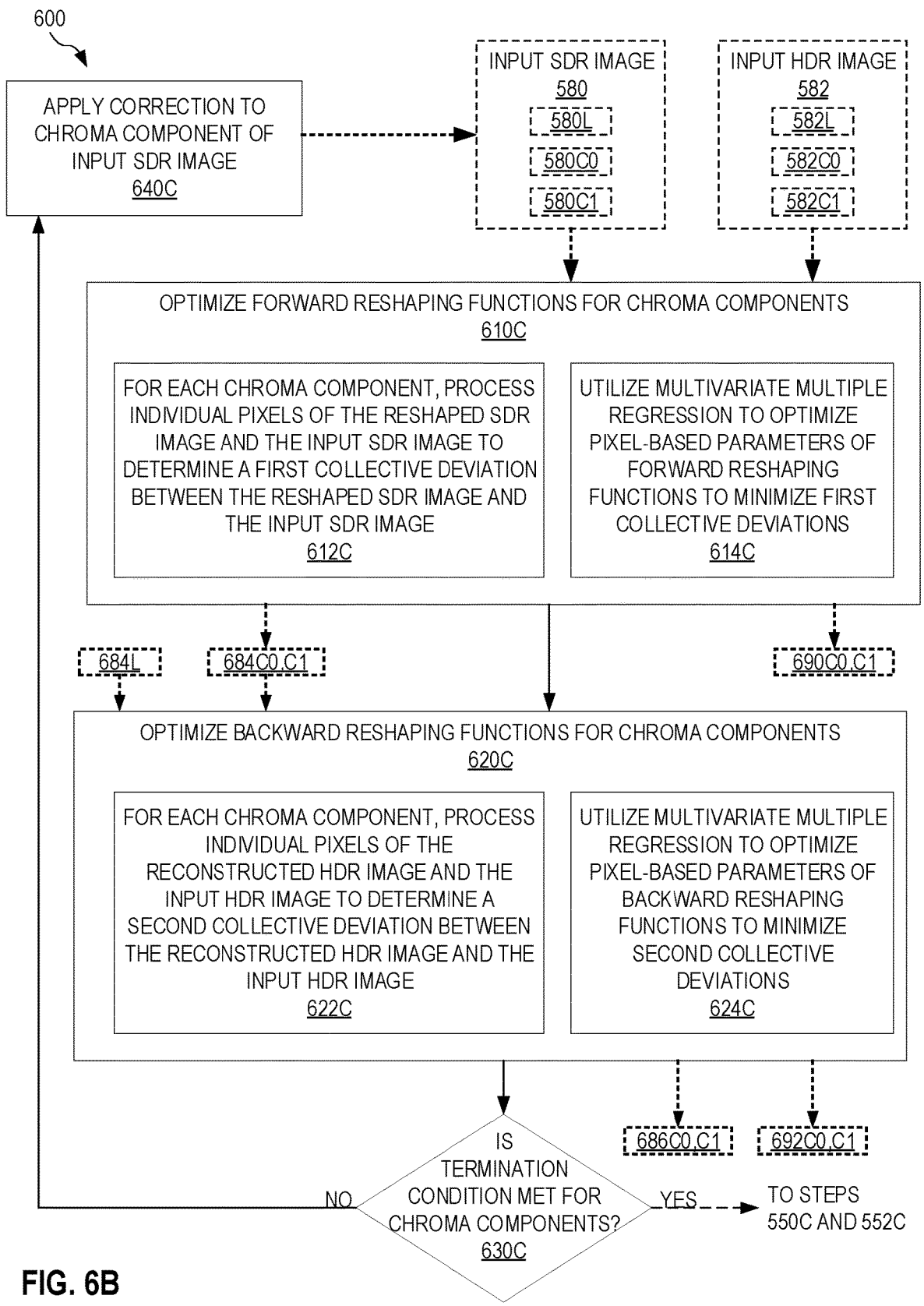

FIGS. 6A and 6B illustrate one pixel-based method 600 for generating forward and backward reshaping functions for color images with backwards error propagation only in chroma channels, wherein each optimization iteration in the chroma channels is MMR-based. Method 600 is an embodiment of method 500. Method 600 may be performed by iterative reshaping-function optimizer 114, for example as implemented in encoder 400. FIG. 6A is a flowchart for generating the forward and backward reshaping functions for a luma component of an input SDR and HDR image pair. FIG. 6B is a flowchart for generating the forward and backward reshaping functions for each chroma component of the input SDR and HDR image pair.

For the luma component, method 600 includes steps 610L and 620L, embodiments of steps 510L and 520L, respectively.

Step 610L optimizes the forward reshaping function for the luma component and includes steps 612L and 614L. Step 612L processes individual pixels of a reshaped SDR image luma component 684L and of input SDR image luma component 580L to determine a first collective (across all pixels) deviation between reshaped SDR image luma component 684L and input SDR image luma component 580L. Step 614L optimizes pixel-based parameters 690L of the forward reshaping function for the luma channel to minimize the first collective deviation. Step 614L may determine the luma-channel forward reshaping function according to cumulative distribution function (CDF) matching between a histogram of reshaped SDR image luma component 684L and a histogram of input SDR image luma component 580L.

Step 620L optimizes the backward reshaping function for the luma component and includes steps 622L and 624L. Step 622L processes individual pixels of a reconstructed HDR image luma component 686L and of input HDR image luma component 582L to determine a second collective (across all pixels) deviation between reconstructed HDR image luma component 686L and input HDR image luma component 582L. Step 624L optimizes pixel-based parameters 692L of the backward reshaping function for the luma channel to minimize the second collective deviation. Step 624L may determine the luma-channel forward reshaping function according to CDF matching between a histogram of reconstructed HDR image luma component 686L and a histogram of input HDR image luma component 582L.

Once step 610L is completed, method 600 may perform step 550L to output reshaped SDR image luma component 684L. Once step 620L is completed, method 600 may perform step 552L to output pixel-based parameters 692L.

For the chroma channels, method 600 includes steps 610C, 620C, 630C, and 640C, which are embodiments of steps 510C, 520C, 530C, and 540C, respectively.

Step 610C optimizes the forward reshaping functions for the chroma components and includes steps 612C and 614C. For each chroma component, step 612C processes individual pixels of a reshaped SDR image chroma component 684C0/C1 and of input SDR image chroma component 580C0/C1 to determine a first collective (across all pixels) deviation between reshaped SDR image chroma component 684C0/C1 and input SDR image chroma component 580C0/C1. Step 612C thus computes a first collective deviation for each chroma channel. Step 614C utilizes MMR to optimize (a) pixel-based parameters 690C0 of the forward reshaping function for the first chroma channel to minimize the first collective deviation for the first chroma channel and (b) pixel-based parameters 690C1 of the forward reshaping function for the second chroma channel to minimize the first collective deviation for the second chroma channel.

Step 620C optimizes the backward reshaping function for the chroma component and includes steps 622C and 624C. For each chroma component, step 622C processes individual pixels of a reconstructed HDR image chroma component 686C0/C1 and of input HDR image chroma component 582C0/C1 to determine a second collective (across all pixels) deviation between reconstructed HDR image chroma component 686C0/C1 and input HDR image chroma component 582C0/C1. Step 622C thus computes a second collective deviation for each chroma channel. Step 624C utilizes MMR to optimize (a) pixel-based parameters 692C0 of the backward reshaping function for the first chroma channel to minimize the second collective deviation for the first chroma channel, and (b) pixel-based parameters 692C1 of the backward reshaping function for the second chroma channel to minimize the second collective deviation for the second chroma channel.

Step 630C is a decision step that evaluates if a termination condition is met for the chroma components. If the termination condition is not met, method 600 proceeds to step 640C and a next iteration of steps 610C, 620C, and 630C. Step 640C applies a correction to one or both of input SDR image chroma components 580C0 and 580C1. Steps 630C and 640C are embodiments of steps 530C and 540C, respectively, based on pixel-by-pixel processing. If step 630C finds that the termination condition is met, method 600 may proceed to steps 550C and 552C to output reshaped SDR image chroma components 684C0 and 684C1 and pixel-based parameters 692C0 and 692C1, respectively.

One example of method 600 is discussed in further detail below in "Example 2: Pixel-Based MMR".

Figure 7A:
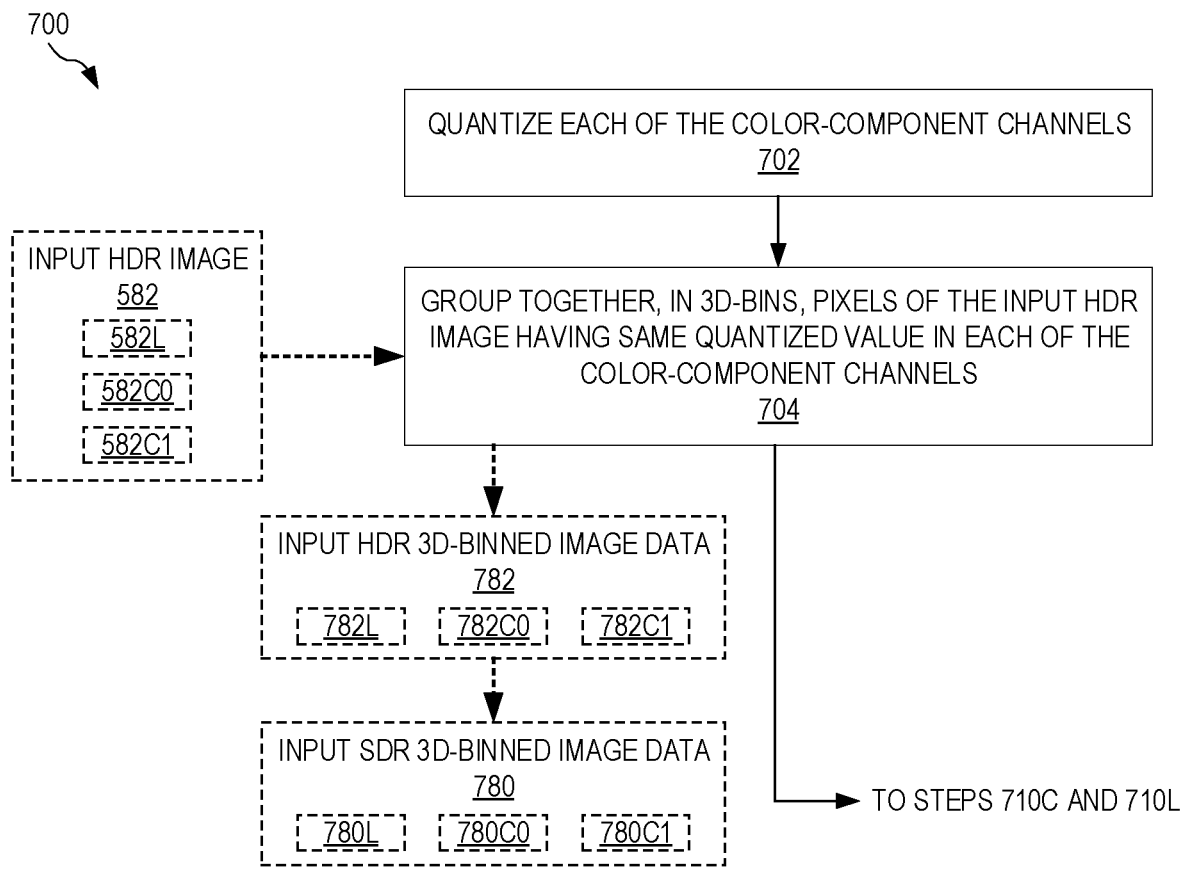
FIGS. 7A-C illustrate an embodiment of the method of FIGS. 5A and 5B based on processing of 3D-binned quantized pixel values.
Figure 7B:
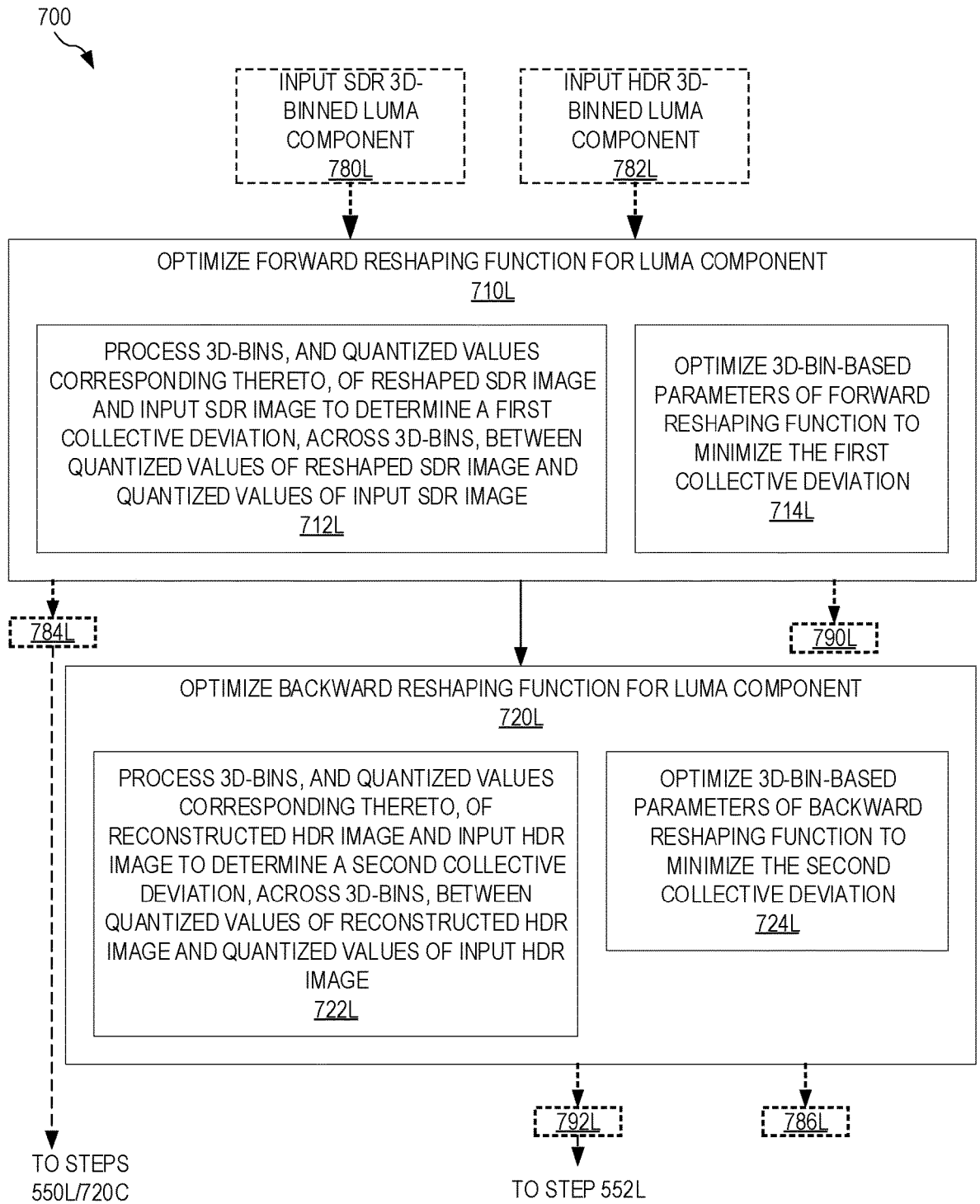
Figure 7C:
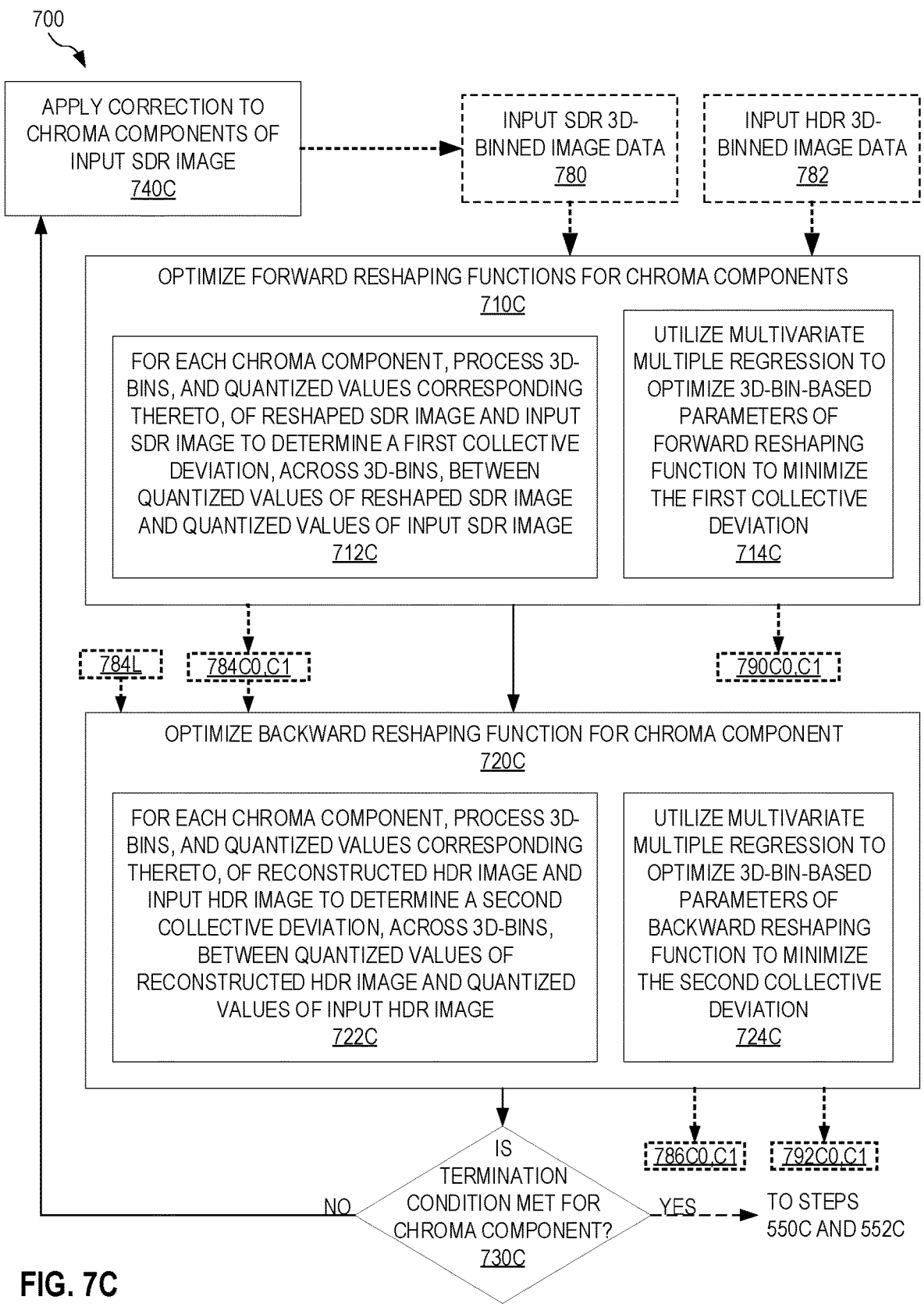

FIGS. 7A-C illustrate one 3D-bin-based method 700 for generating forward and backward reshaping functions for color images with backwards error propagation only in chroma channels, wherein each optimization iteration in the chroma channels is MMR-based. Method 700 is an embodiment of method 500. Method 700 may be performed by iterative reshaping-function optimizer 114, for example as implemented in encoder 400. FIG. 7A is a flowchart for creating the 3D bins. FIG. 7B is a flowchart for generating the forward and backward reshaping functions for a luma component of an input SDR and HDR image pair. FIG. 7C is a flowchart for generating the forward and backward reshaping functions for each chroma component of the input SDR and HDR image pair.

Method 700 includes steps 702 and 704 (see FIG. 7A). Step 702 quantizes each of the luma channel, the first chroma channel, and the second chroma channel. Step 704 bins input HDR image 582, which has a luma component 582L, a first chroma component 582C0, and a second chroma component 582C1. More specifically, step 704 groups together, in 3D-bins, pixels that in input HDR image 582 have the same quantized value in each of luma component 582L, a first chroma component 582C0, and a second chroma component 582C1. For example, step 702 may quantize each color-component channel in 100 pixel-value bins having bin numbers 0-99, and step 704 then groups together in a 3D-bin assigned 3D-bin number 12,46,33 all pixels of input HDR image 582 for which the pixel value of luma component 582L is in bin number 12 for the luma channel, the pixel value of the first chroma component 582C0 is in bin number 46 for the first chroma channel, and the pixel value of the second chroma component 582C1 is in bin number 33 for the second chroma channel. Step 704 also applies the 3D-binning of pixels, thus defined by input HDR image 582, to pixels of input SDR image 580. In following steps of method 700, the same 3D-binning is used for the reshaped SDR image generated by method 700.

In summary, step 704 generates input HDR 3D-binned image data 782 and input SDR 3D-binned image data 780. Input HDR 3D-binned image data 782 includes an input HDR 3D-binned luma component 782L, an input HDR 3D-binned chroma component 782C0, and an input HDR 3D-binned chroma component 782C1. The term input HDR 3D-binned chroma component 782C refers non-specifically to one of input HDR 3D-binned chroma components 782C0 and 782C1. Input SDR 3D-binned image data 780 includes an input SDR 3D-binned luma component 782L, an input SDR 3D-binned chroma component 780C0, and an input SDR 3D-binned chroma component 780C1. The term input SDR 3D-binned chroma component 780C refers non-specifically to one of input SDR 3D-binned chroma components 780C0 and 780C1.

As compared to pixel-based method 600, 3D-bin based method 700 may save memory space, and offer faster processing and/or reduce the requirements to computational resources, since all similarly appearing pixels are grouped together. Steps 702 and 704 may be encoded in machine-readable instructions 430 of encoder 400 of FIG. 4.

After completion of step 704, method 700 proceeds to optimization of the luma channel as shown in FIG. 7B and optimization of the chroma channels as shown in FIG. 7C.

For the luma component, method 700 includes steps 710L and 720L, embodiments of steps 510L and 520L, respectively.

Step 710L optimizes the forward reshaping function for the luma component and includes steps 712L and 714L. Steps 712L and 714L are similar to steps 612L and 614L except for operating on 3D-bins instead of individual pixels. As a result, step 710L generates 3D-binned reshaped SDR luma component data 784L in place of reshaped SDR image luma component 684L, and optimizes 3D-bin-based parameters 790L of the forward reshaping function for the luma channel.

Step 720L optimizes the backward reshaping function for the luma component and includes steps 722L and 724L. Steps 722L and 724L are similar to steps 622L and 624L except for operating on 3D-bins instead of individual pixels. As a result, step 720L generates 3D-bin-based parameters 792L of the backward reshaping function for the luma channel, and operates with 3D-binned reconstructed HDR luma component data 786L in place of reconstructed HDR image luma component 686L.

Once step 710L is completed, method 700 may perform step 550L to output reshaped 3D-binned reshaped SDR chroma component data 784C. Without departing from the scope hereof, method 700 may include converting reshaped 3D-binned reshaped SDR luma component data 784L to a pixel-based representation of the reshaped SDR luma component and outputting this pixel-based representation in step 550L. Once step 720L is completed, method 700 may perform step 552L to output 3D-bin-based parameters 792L.

For the chroma channels, method 700 includes steps 710C, 720C, 730C, and 740C, which are embodiments of steps 510C, 520C, 530C, and 540C, respectively.

Step 710C optimizes the forward reshaping functions for the chroma components and includes steps 712C and 714C. Steps 712C and 714C are similar to steps 612C and 614C except for operating on 3D-bins instead of individual pixels. As a result, step 710C generates 3D-binned reshaped SDR chroma component data 784C0 and 784C1 in place of reshaped SDR image chroma components 684C0 and 684C1, and optimizes 3D-bin-based parameters 790C0 and 790C1 of the forward reshaping function for the first and second chroma channels, respectively.

Step 720C optimizes the backward reshaping functions for the chroma components and includes steps 722C and 724C. Steps 722C and 724C are similar to steps 622C and 624C except for operating on 3D-bins instead of individual pixels. As a result, step 720C generates 3D-bin-based parameters 792C0 of the backward reshaping function for the first chroma channel and 3D-bin-based parameters 792C1 of the backward reshaping function for the second chroma channel, and operates with 3D-binned reconstructed HDR chroma component data 786C0 and 786C1 in place of reconstructed HDR image chroma components 686C0 and 686C1.

Step 730C is a decision step that evaluates if a termination condition is met for the chroma components. If the termination condition is not met, method 700 proceeds to step 740C and a next iteration of steps 710C, 720C, and 730C. Step 740C applies a correction to one or both of input SDR 3D-binned chroma components 780C0 and 780C1. Steps 730C and 740C are similar to steps 630C and 640C, respectively, except for being based on 3D-bin-by-3D-bin processing rather than pixel-by-pixel processing. If step 730C finds that the termination condition is met, method 700 may proceed to steps 550C and 552C to output reshaped 3D-binned reshaped SDR chroma component data 784C0 and 784C1 and 3D-bin-based parameters 792C0 and 782C1, respectively. Without departing from the scope hereof, method 700 may include converting reshaped 3D-binned reshaped SDR chroma component data 784C0 and 784C1 to pixel-based representations of the reshaped SDR chroma components and outputting these pixel-based representations in step 550C.

One example of method 700 is discussed in further detail below in "Example 3: 3D-Bin-Based MMR".

Without departing from the scope hereof, the chroma channels may be processed by 3D-bin-based method 700 (according to the flow charts outlined in FIGS. 7A and 7B), while the luma channel is processed by pixel-based method 600 (according to the flow-chart outlined in FIG. 6B).

Figure 8:
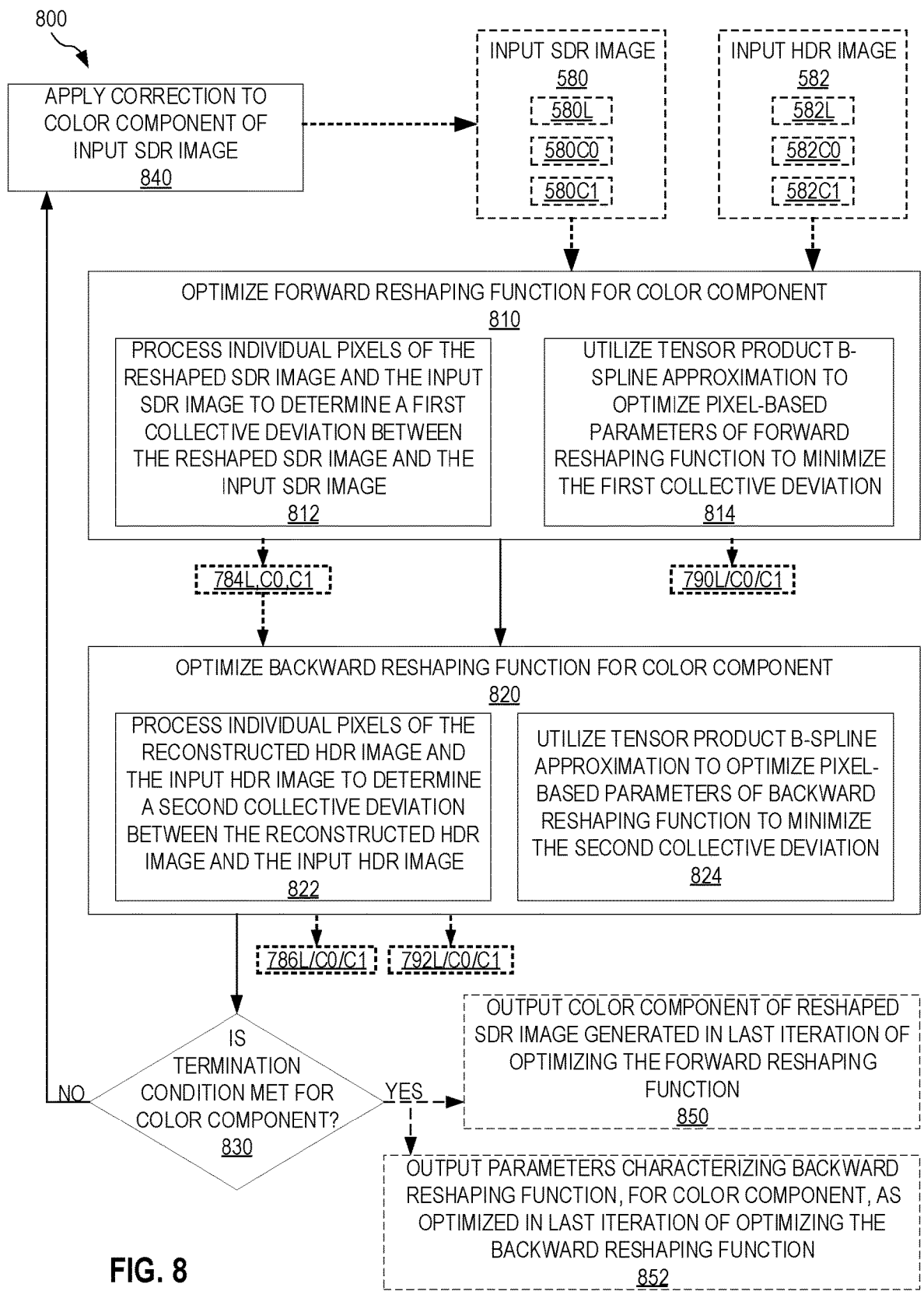
FIG. 8 illustrates a pixel-based method for generating forward and backward reshaping functions for color images, with iterative tensor product b-spline approximation based optimization and backwards error propagation in each color-component channel, according to an embodiment.

FIG. 8 illustrates one pixel-based method 800 for generating forward and backward reshaping functions for color images, with iterative TPBS-approximation-based optimization and backwards error propagation in each color-component channel. Method 800 is an embodiment of method 200 and may implement method 300. Method 800 may be performed by iterative reshaping-function optimizer 114, for example as implemented in encoder 400. Method 800 includes steps 810, 820, 830, and 840, embodiments of steps 210, 220, 230, and 240, respectively.

Each color-component channel, method 800 takes input SDR image 580 and input HDR image 582 as input, and performs one or more iterations of steps 810, 820, 830, and 840 to generate the forward and backward reshaping functions, as well as associated reshaped SDR image data, for the color-component channel under consideration. If, for a color-component channel, only one iteration is performed, step 840 is omitted from the processing of this color-component channel.

Step 810 optimizes the forward reshaping function for the color-component channel under consideration and includes steps 812 and 814. Step 812 processes individual pixels of a reshaped SDR image color component 784 and of the associated color component of input SDR image 580, i.e., one of color components 580L, 580C0, and 580C1, to determine a first collective (across all pixels) deviation between reshaped SDR image color component 784 and the color component of input SDR image 580. Step 814 utilizes TPBS approximation to optimize pixel-based parameters 790 of the forward reshaping function for the color-component channel to minimize the first collective deviation.

Step 820 optimizes the backward reshaping function for the color-component channel under consideration and includes steps 822 and 824. Step 822 processes individual pixels of a reconstructed HDR image color component 786 and of the associated color component of input HDR image 582, i.e., one of color components 582L, 582C0, and 582C1, to determine a second collective (across all pixels) deviation between reconstructed HDR image color component 786 and the color component of input HDR image 582. Step 824 utilizes TPBS approximation to optimize pixel-based parameters 792 of the backward reshaping function for the color-component channel to minimize the second collective deviation.

Step 830 is a decision step that evaluates if a termination condition is met for the color component. If the termination condition is not met, method 800 proceeds to step 840 and a next iteration of steps 810, 820, and 830. Step 840 applies a correction to the color component of input SDR image 580 under consideration. Steps 830 and 840 are embodiments of steps 230 and 240, respectively. If step 830 finds that the termination condition is met, method 800 may proceed to steps 850 and 852. Step 850 outputs reshaped SDR image color component 784 for the color-component channel under consideration, as optimized in a last iteration of step 810.

Step 852 outputs pixel-based parameters 792 for the color-component channel under consideration, as optimized in a last iteration of step 820.

One example of method 800 is discussed in further detail below in "Example 4: Pixel-Based TPBS Approximation".

In the same manner that method 700 is 3D-bin-based alternative to pixel-based method 600, method 800 may be modified to instead process 3D-binned image data. One example of such a method is discussed in further detail below in "Example 5: 3D-Bin-Based TPBS Approximation".

Example 1: Polynomial Reshaping Functions

In this example, method 200 is performed with each of the forward reshaping function $FR_t^{ch,(k)}()$ and the backward reshaping function $BR_t^{ch,(k)}()$ being a 4th-order polynomial, such that each of steps 210 and 220 optimizes five polynomial coefficients. This optimization may be done according to a least-squares minimization. While more advanced optimization algorithms are expected to provide better performance, this example is used here as an illustration and may be implemented in scenarios where computational ease outweighs performance. The input data processed in this example of method 200 has only a single color-component, equivalent to a luma component, a single chroma component, or grayscale image data.

Figure 9:
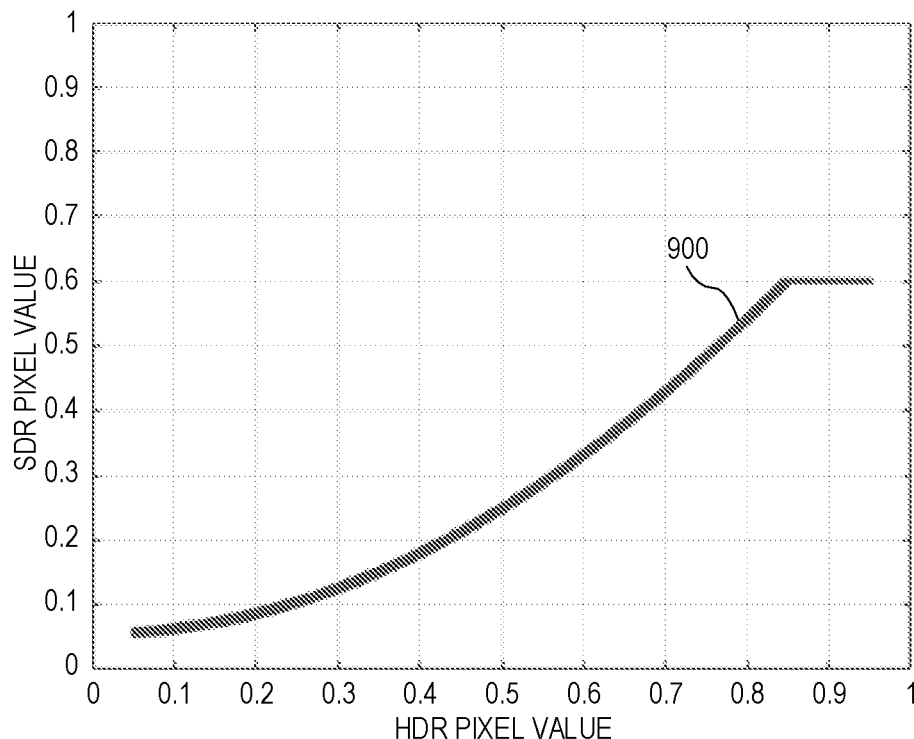
FIGS. 9-16 are plots illustrating an embodiment of the method of FIG. 2 as applied to example images.

An input HDR image 182 is generated with random pixel values. An input SDR image 180 is generated from input HDR image 182 by clipping the dynamic range, introducing polynomial distortion, and adding noise. The resulting correspondence 900 between HDR pixel values and SDR pixel values is plotted in FIG. 9. Method 200 is applied to these examples of input SDR image 180 and input HDR image 182, with 100 iterations being performed.

Figure 10:
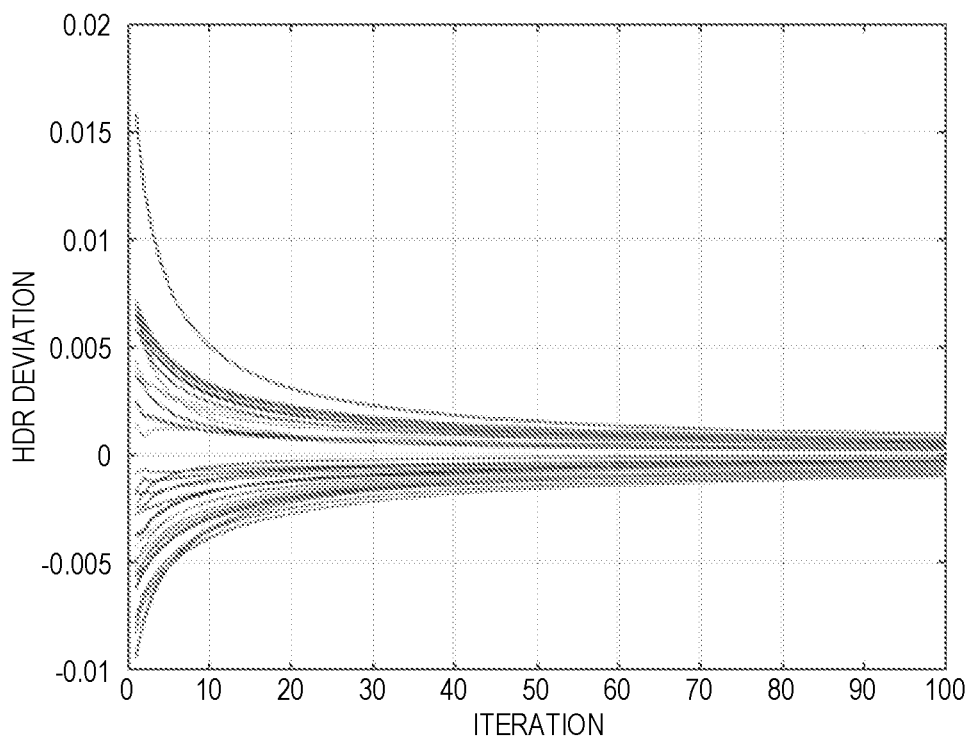
Figure 11:
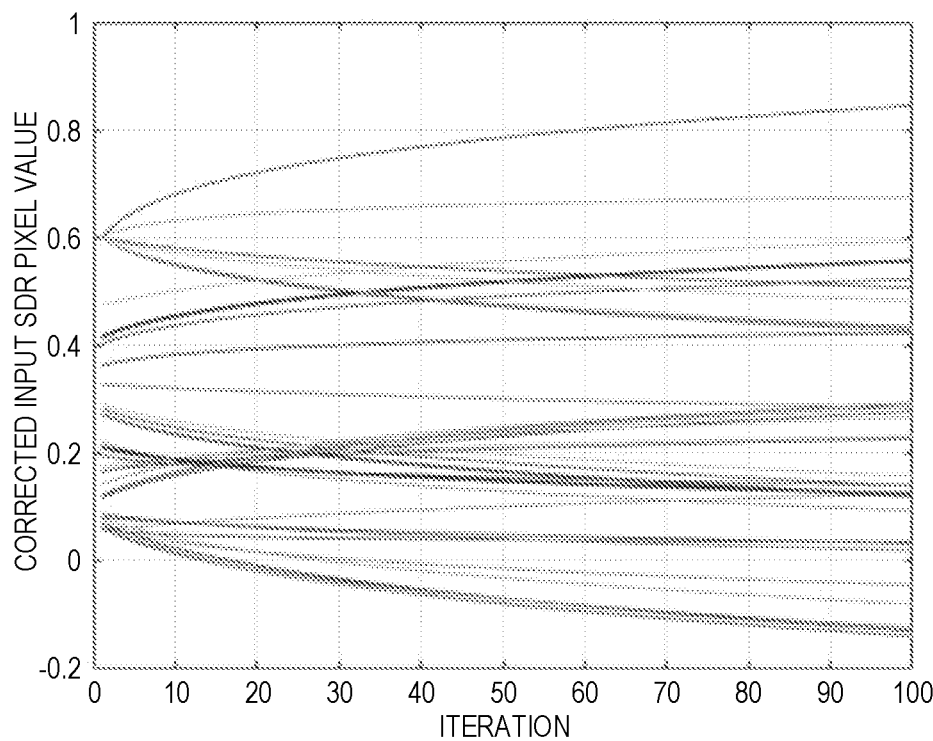
Figure 12:
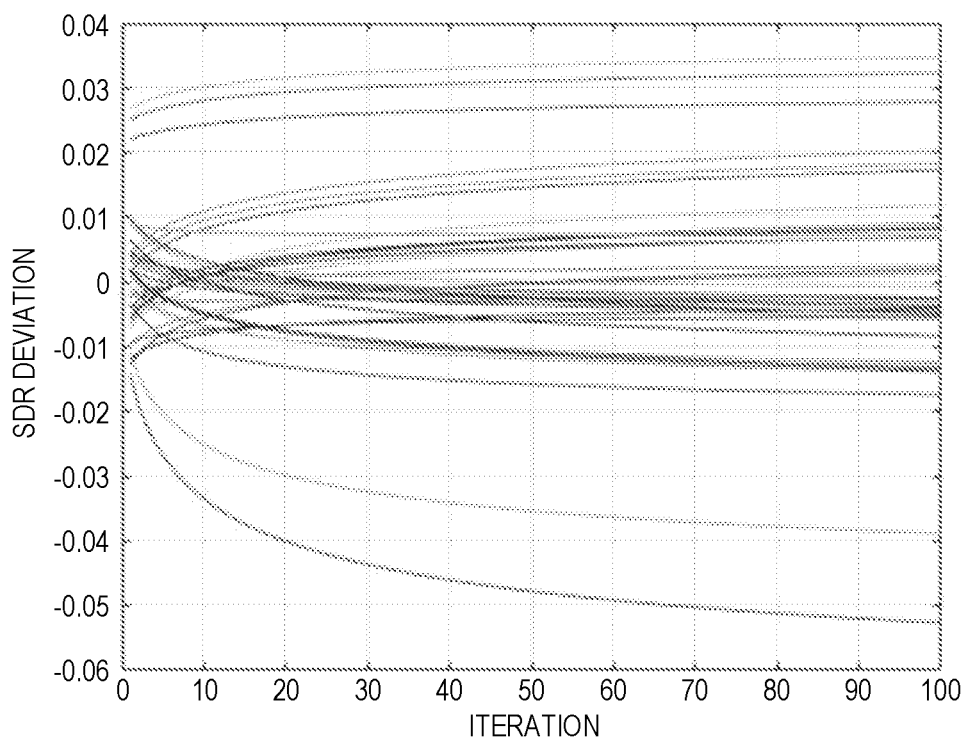
Figure 13:
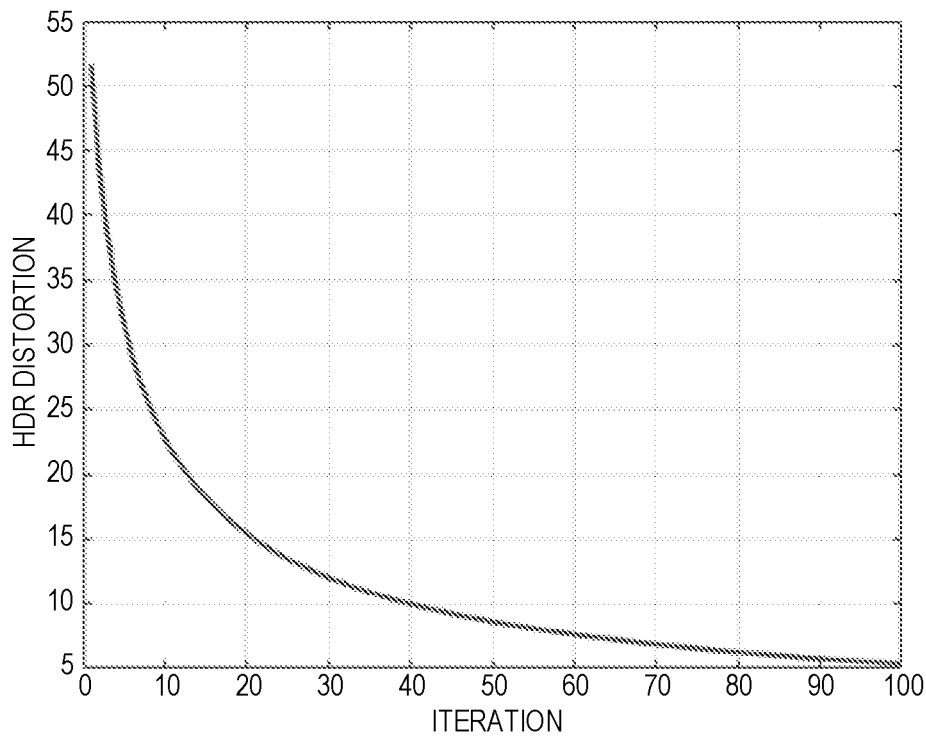
Figure 14:
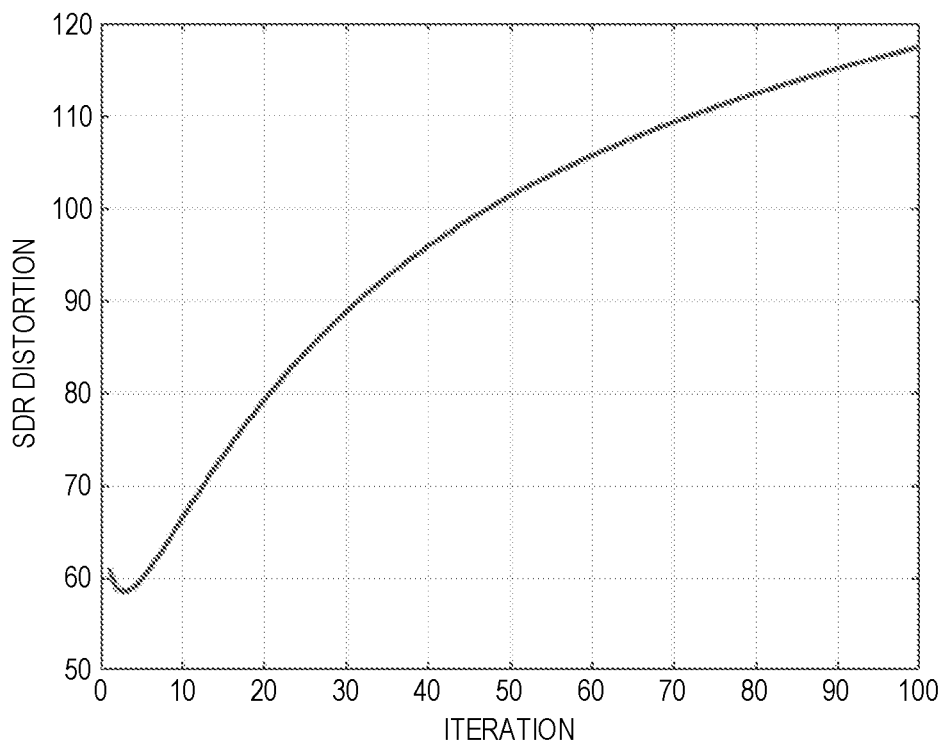

FIG. 10 plots, for every 250th pixel of input HDR image 182 and as a function of iteration number, the deviation between input HDR image 182 and reconstructed HDR image 186 generated in step 220. Each curve in FIG. 10 corresponds to a different pixel. FIG. 11 plots, as a function of iteration number, the pixel value for every 250th pixel of input SDR image 180 as it is being corrected in step 240. FIG. 12 plots, for every 250th pixel of input SDR image 180 and as a function of iteration number, the deviation between input SDR image 180 and reshaped SDR image 184 as corrected in step 240. FIG. 14 plots, as a function of iteration number, a total SDR distortion calculated as the sum of the SDR deviations plotted in FIG. 12. FIG. 13 plots, as a function of iteration number, a total HDR distortion calculated as the sum of the HDR distortions plotted in FIG. 10. It is evident from FIGS. 10 and 13 that the iterative optimization in method 200 converges and reduces discrepancy between input HDR image 182 and reconstructed HDR image 186. At the same time, it is evident from FIGS. 11, 12 and 14 that the improved agreement between input HDR image 182 and reconstructed HDR image 186 comes at the cost of some distortion being introduced into reshaped SDR image 184. Depending on the application scenario and associated requirements, combination weights $w_v$ and $w_s$ may be adjusted to define a desired tradeoff between HDR distortion and SDR distortion.

Figure 15:
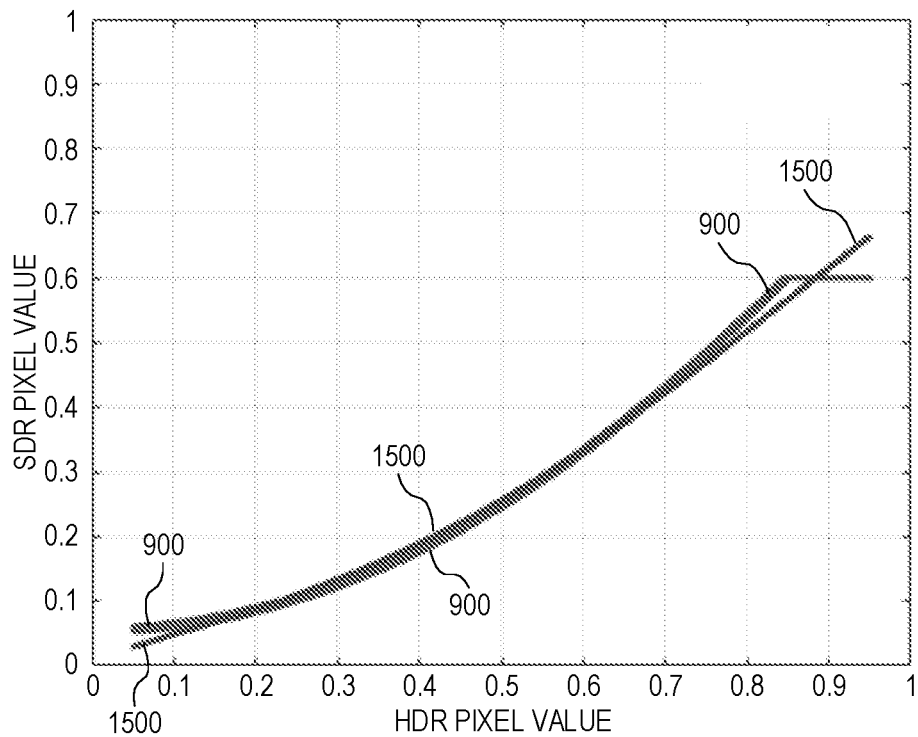
Figure 16:
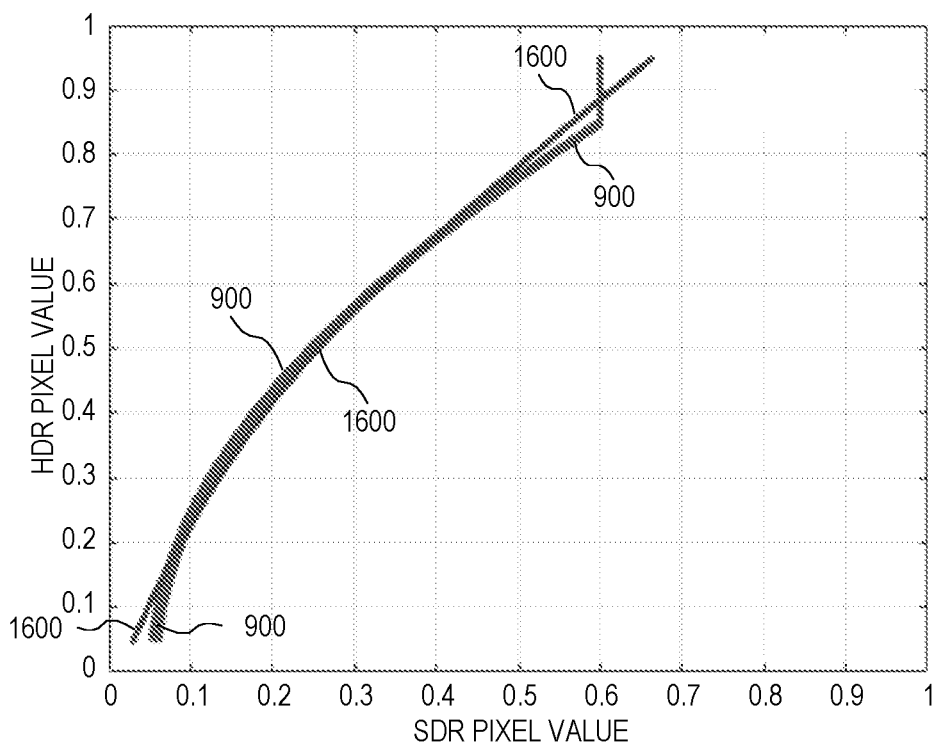

FIG. 15 plots the forward reshaping function 1500, generated in the last iteration of step 210, together with correspondence 900. Forward reshaping function 1500 resolves the clipping issue in correspondence 900 while achieving reasonable agreement with the non-clipped portion of correspondence 900. Since the forward reshaping function avoids clipping, reshaped SDR image 184 may be preferable over input SDR image 180 in scenarios where the display system is configured to display SDR imagery. FIG. 16 plots the backward reshaping function 1600, generated in the last iteration of step 220, together with correspondence 900. Backward reshaping function 1600, while being indirectly partly based on input SDR image 180, also does not exhibit the clipping issue in correspondence 900, and further achieves reasonable agreement with the non-clipped portion of correspondence 900. Both the forward reshaping function and the backward reshaping function show some residual distortion for the non-clipped portion of correspondence 900. This distortion may be at least partly a result of the relatively simplistic (4th-order polynomial) nature of the optimization applied in the present example.

Example 2: Pixel-based MMR

In the following, we outline one example of method 600.
Luma Channel:
In this example, the luma channel (denoted y) is a single-channel predictor. The forward reshaping function in step 620L is a one-dimensional (1D) lookup table (LUT) and the backward reshaping function in step 610L is an 8-piece 2nd-order polynomial predictor. The backward reshaping function is also expressed as a 1D-LUT. Note that since the predictor is 1D-LUT and can be easily obtained in an invertible fashion, there is no iteration involved in the luma channel. We define the following notations:

$$\hat{s}_{t,i}^{y} = FR_t^y(v_{t,i}^y),$$

$$\hat{v}_{t,i}^{y} = BR_t^y(\hat{s}_{t,i}^y),$$

$$\hat{s}_t^y = \begin{bmatrix} \hat{s}_{t,0}^y \\ \hat{s}_{t,1}^y \\ \vdots \\ \hat{s}_{t,P-1}^y \end{bmatrix}, \text{ and } \hat{v}_t^y = \begin{bmatrix} \hat{v}_{t,0}^y \\ \hat{v}_{t,1}^y \\ \vdots \\ \hat{v}_{t,P-1}^y \end{bmatrix}.$$

Chroma Channel:
The chroma channels (c0 and c1) use MMR prediction. In MMR forward reshaping in step 610C, we take all three color-component channels from the HDR domain ($v_{t,i}^y$, $v_{t,i}^{c0}$, $v_{t,i}^{c1}$) as input to predict the SDR chroma-components $s_{t,i}^{c0}$, $s_{t,i}^{c1}$. The predicted (reshaped) value is ($\hat{s}_{t,i}^{y}, \hat{s}_{t,i}^{c0,(k)}$, $\hat{s}_{t,i}^{c1,(k)}$) at the $k^{th}$ iteration. We use these three SDR predicted values as input for the backward reshaping optimization in step 620C to predict the HDR chroma value ($v_{t,i}^{c0}$, $v_{t,i}^{c1}$). The predicted (reconstructed) value at the $k^{th}$ iteration is ($\hat{v}_{t,i}^{c0,(k)}, \hat{v}_{t,i}^{c1,(k)}$). Note that there are some matrices used in each iteration that will not change and can be pre-computed.
Initialization:
At the first iteration (k=0), we set the corrected input SDR image as the original input SDR image, i.e., $\tilde{s}_{t,i}^{ch,(0)} = s_{t,i}^{ch}$ for all 3 channels (ch=y, c0, and c1). Denote the MMR expanded form for the $i^{th}$ input HDR pixel as:

$$\bar{v}_{t,i} = [v_{t,i}^y v_{t,i}^{c0} v_{t,i}^{c1} \ldots v_{t,i}^y v_{t,i}^{c0} \ldots (v_{t,i}^y v_{t,i}^{c0})^2 \ldots (v_{t,i}^{c0})^2 (v_{t,i}^{c1})^2 \ldots ]^T.$$

Collect all P pixels to get an expanded matrix:

$$V_t = \begin{bmatrix} (\bar{v}_{t,0})^T \\ (\bar{v}_{t,1})^T \\ \vdots \\ (\bar{v}_{t,P-1})^T \end{bmatrix}.$$

We can also define the following matrix, which will be used in the coefficient optimization process:

$$B_t^V = V_t^T \cdot V_t.$$

We also prepare the input HDR chroma components in vector form:

$$v_t^{c0} = \begin{bmatrix} v_{t,0}^{c0} \\ v_{t,1}^{c0} \\ \vdots \\ v_{t,P-1}^{c0} \end{bmatrix}, \text{ and } v_t^{c1} = \begin{bmatrix} v_{t,0}^{c1} \\ v_{t,1}^{c1} \\ \vdots \\ v_{t,P-1}^{c1} \end{bmatrix}.$$

Note that $v_t^{c0}$, $v_t^{c1}$, $V_t$, $B_t^V$, and $(B_t^V)^{-1}$ will not change during the iteration since they represent the input HDR image. They can be pre-computed and stored in memory without re-computing.
Forward Reshaping:
With forward MMR coefficients $m_t^{F,c0,(k)}$ and $m_t^{F,c1,(k)}$ in the c0 and c1 channels, the predicted SDR values at the $k^{th}$ iteration can be found via $$\hat{s}_t^{c0,(k)} = V_t \cdot m_t^{F,c0,(k)}, \text{ and}$$

$$\hat{s}_t^{c1,(k)} = V_t \cdot m_t^{F,c1,(k)},$$

where $$\hat{s}_t^{c0,(k)} = \begin{bmatrix} \hat{s}_{t,0}^{c0,(k)} \\ \hat{s}_{t,1}^{c0,(k)} \\ \vdots \\ \hat{s}_{t,P-1}^{c0,(k)} \end{bmatrix}, \text{ and } \hat{s}_t^{c1,(k)} = \begin{bmatrix} \hat{s}_{t,0}^{c1,(k)} \\ \hat{s}_{t,1}^{c1,(k)} \\ \vdots \\ \hat{s}_{t,P-1}^{c1,(k)} \end{bmatrix}.$$

At each iteration, we collect the corrected SDR values from the previous iteration as vectors $$\tilde{s}_t^{c0,(k)} = \begin{bmatrix} \tilde{s}_{t,0}^{c0,(k)} \\ \tilde{s}_{t,1}^{c0,(k)} \\ \vdots \\ \tilde{s}_{t,P-1}^{c0,(k)} \end{bmatrix}, \text{ and } \tilde{s}_t^{c1,(k)} = \begin{bmatrix} \tilde{s}_{t,0}^{c1,(k)} \\ \tilde{s}_{t,1}^{c1,(k)} \\ \vdots \\ \tilde{s}_{t,P-1}^{c1,(k)} \end{bmatrix}.$$

These two vectors will be the target values the forward prediction to achieve at iteration k. Note that luma predicted values won't change at each iteration.
Define the following two vectors to facilitate the discussion of coefficient optimization:

$$a_t^{V,c0,(k)} = V_t^T \cdot \tilde{s}_t^{c0,(k)}, \text{ and}$$

$$a_t^{V,c1,(k)} = V_t^T \cdot \tilde{s}_t^{c1,(k)}.$$

The goal of coefficient optimization is to find the MMR coefficients to minimize the mean-square error (MSE) between the corrected input SDR signal and the predicted (reshaped) SDR signal at iteration k:

$$m_t^{F,c0,(k),opt} = \arg\min \|\hat{s}_t^{c0,(k)} - \tilde{s}_t^{c0,(k)}\|^2 = \arg\min \|V_t \cdot m_t^{F,c0,(k)} - \tilde{s}_t^{F,c0,(k)}\|^2$$

$$m_t^{F,c1,(k),opt} = \arg\min \|\hat{s}_t^{c1,(k)} - \tilde{s}_t^{c1,(k)}\|^2 = \arg\min \|V_t \cdot m_t^{F,c1,(k)} - \tilde{s}_t^{F,c1,(k)}\|^2$$

The optimal MMR coefficients in forward reshaping can be found at the least squared solutions:

$$m_t^{F,c0,(k),opt}=(B_t^V)^{-1}a_t^{V,c0,(k)}, \text{ and}$$

$$m_t^{F,c1,(k),opt}=(B_t^V)^{-1}a_t^{V,c1,(k)}.$$

The optimal predicted SDR values at iteration k can be expressed as $$\hat{s}_t^{c0,(k)}=V_t \cdot m_t^{F,c0,(k)opt}, \text{ and}$$

$$\hat{s}_t^{c1,(k)}=V_t \cdot m_t^{F,c1,(k)opt}.$$

Backward Reshaping:

At the $k^{th}$ iteration, denote the MMR expanded form for a predicted SDR pixel $$\bar{s}_{t,i}^{(k)}[1\hat{s}_{t,i}^y\hat{s}_{t,i}^{c0,(k)}\hat{s}_{t,i}^{c1,(k)}\ldots \hat{s}_{t,i}^y\hat{s}_{t,i}^{c0,(k)} \ldots$$
$$(\hat{s}_{t,i}^y\hat{s}_{t,i}^{c0,(k)})^2 \ldots (\hat{s}_{t,i}^{c0,(k)})^2(\hat{s}_{t,i}^{c0,(k)})^2 \ldots ]^T.$$

We can collect all P pixels together to construct a matrix $$S_t^{(k)} = \begin{bmatrix} (\bar{s}_{t,0}^{(k)})^T \\ (\bar{s}_{t,1}^{(k)})^T \\ \vdots \\ (\bar{s}_{t,P-1}^{(k)})^T \end{bmatrix}.$$

Define the following matrix which will be used in coefficient optimization process:

$$B_t^{S,(k)}=(S_t^{(k)})^T \cdot S_t^{(k)}.$$

With backward MMR coefficients $m_t^{B,c0,(k)}$ and $m_t^{B,c1,(k)}$ in the c0 and c1 channels, the predicted HDR values at the $k^{th}$ iteration can be found via $$\hat{v}_t^{c0,(k)}=S_t^{(k)} \cdot m_t^{B,c0,(k)}, \text{ and}$$

$$\hat{v}_t^{c1,(k)}=S_t^{(k)} \cdot m_t^{B,c1,(k)},$$

where $$\hat{v}_t^{c0,(k)} = \begin{bmatrix} \hat{v}_{t,0}^{c0,(k)} \\ \hat{v}_{t,1}^{c0,(k)} \\ \vdots \\ \hat{v}_{t,P-1}^{c0,(k)} \end{bmatrix} \text{ and } \hat{v}_t^{c1,(k)} = \begin{bmatrix} \hat{v}_{t,0}^{c1,(k)} \\ \hat{v}_{t,1}^{c1,(k)} \\ \vdots \\ \hat{v}_{t,P-1}^{c1,(k)} \end{bmatrix}.$$

We also define the following vectors to facilitate the coefficient optimization:

$$a_t^{S,c0,(k)}=(S_t^{(k)})^T \cdot v_t^{c0},$$

$$a_t^{S,c1,(k)}=(S_t^{(k)})^T \cdot v_t^{c1}.$$

The optimization goal is to find the MMR coefficients to minimize the MSE between the original input HDR signal and the predicted (reconstructed) HDR signal at iteration k:

$$m_t^{B,c0,(k),opt}=\text{argmin}\|\hat{v}_t^{c0,(k)}-V_t^{c0}\|^2=$$
$$\text{argmin}\|S_t^{(k)} \cdot m_t^{B,c0,(k)} \cdot v_t^{c0}\|^2,$$

$$m_t^{B,c1,(k),opt}=\text{argmin}\|\hat{v}_t^{c1,(k)}-V_t^{c1}\|^2=$$
$$\text{argmin}\|S_t^{(k)} \cdot m_t^{B,c1,(k)} \cdot v_t^{c1}\|^2.$$

The optimal MMR coefficients in backward reshaping can be found as the least squared solutions:

$$m_t^{B,c0,(k),opt}=(B_t^{S,(k)})^{-1}a_t^{S,c0,(k)}, \text{ and}$$

$$m_t^{B,c1,(k),opt}=(B_t^{S,(k)})^{-1}a_t^{S,c1,(k)}.$$

The predicted HDR values can be expressed as $$\hat{v}_t^{c0,(k)}=S_t^{(k)} \cdot m_t^{B,c0,(k),opt}, \text{ and}$$

$$\hat{v}_t^{c1,(k)}=S_t^{(k)} \cdot m_t^{B,c1,(k),opt}.$$

Iteration Control and Computation of Corrected Input SDR Signal in Steps 630C and 640C:

At the end of each iteration, based on the reconstructed HDR signal and the input HDR signal, we determine the amounts $\Delta\tilde{s}_{t,i}^{c0,(k)}$ and $\Delta\tilde{s}_{t,i}^{c1,(k)}$ by which to correct the input SDR signals $\tilde{s}_{t,i}^{c0,(k+1)}$ and $\tilde{s}_{t,i}^{c1,(k+1)}$ respectively. These correction amounts are a function of $\hat{v}_{t,i}^{ch,(k)}$ and $v_{t,i}^{ch}$:

$$\Delta\tilde{s}_{t,i}^{ch,(k)} = \begin{cases} \alpha^{ch}(v_{t,i}^{ch}-\hat{v}_{t,i}^{ch,(k)}) & \text{when } |v_{t,i}^{ch}-\hat{v}_{t,i}^{ch,(k)}| > \varepsilon \\ 0 & \text{otherwise} \end{cases}.$$

$\varepsilon$ is a threshold to determine whether to proceed to input SDR image correction in step 640C. $\alpha^{ch}$ is a convergence scaling factor and serves as tradeoff between convergence speed and distortion. To avoid too much change in the input SDR signal, we can set a correction upper bound as $$\Delta\tilde{s}_{t,i}^{ch,(k)}=\min(\Delta\tilde{s}_{t,i}^{ch,(k)},\lambda).$$

The corrected input SDR value is updated, in step 640C, for the next iteration as:

$$\tilde{s}_{t,i}^{ch,(k+1)}=\min(\tilde{s}_{t,i}^{ch,(k)}+\Delta\tilde{s}_{t,i}^{ch,(k)}.$$

Iteration Termination:

Iteration termination is carried out as discussed above in reference to FIG. 2 in section "Mathematical description of one embodiment of method 200".

Example 3: 3D-Bin-Based MMR

In the following, we outline one example of method 700.

Basis of 3D-Binning:

Let $v_{t,i}=[v_{t,i}^y \ v_{t,i}^{c0} \ v_{t,i}^{c1}]^T$ denote the three color values of the $i^{th}$ pixel from the input HDR signal for the $t^{th}$ frame. Let $s_{t,i}=[s_{t,i}^y \ s_{t,i}^{c0} \ s_{t,i}^{c1}]^T$ denote the corresponding pixel in the input SDR image at the $i^{th}$ pixel for the $t^{th}$ frame. We quantize the HDR image with three channel values (Y, $C_0$ and $C_1$) using a fixed number of bins $Q_y$, $Q_{C_0}$, $Q_{C_1}$ for each color component. We use uniform partition boundaries which cover the min/max ($v_{t,i}^{ch,min}$, $v_{t,i}^{ch,max}$) value in each dimension to compute the ($Q_y \times Q_{C_0} \times Q_{C_1}$) 3D histogram. The quantization interval in each channel is $$d_t^{ch}=(v_{t,i}^{ch,max}-v_{t,i}^{ch,min})/Q_{ch}.$$

Denote the 3D histogram bin as $\Omega_t^{Q,v}$, where $Q=[(Q_y, Q_{C_0}, Q_{C_1})]$. Thus, $\Omega_t^{Q,v}$ contains a total of $(Q_y \cdot Q_{C_0} \cdot Q_{C_1})$ bins such that each 3D-bin is specified by the bin index $q=(q_y, q_{C_0}, q_{C_1})$, which represents the number of pixels having those 3-channel quantized values. To simplify the notation, we vectorize the 3D-bin index $\{q\}$ to a 1D index $\{q\}$.

$$q=q_y \cdot Q_{C_0} \cdot Q_{C_1}+q_{C_0} \cdot Q_{C_1}+q_{C_1}$$

We also compute the sum of each color component in the SDR for each 3D-bin. Let $\Psi_{t,y}^{Q,s}$, $\Psi_{t,C_0}^{Q,s}$ and $\Psi_{t,C_1}^{Q,s}$ be the mapped luma and chroma values in the SDR image domain such that each bin of these contains the sum of all HDR luma and chroma ($C_0$ and $C_1$, respectively) pixel values where the corresponding pixel value lies in that bin.

Assume we have P pixels, the operations can be summarized as follows in pseudo code:

```
// STEP 1: initialization
Ω_{t,q}^{Q,v} = 0 where q_{ch} = 0, ..., Q_{ch} − 1, for each ch = {y, C_0, C_1}
Ψ_{t,y,q}^{Q,s} = 0 where q_{ch} = 0, ..., Q_{ch} − 1, for each ch = {y, C_0, C_1}
Ψ_{t,C_0,q}^{Q,s} = 0 where q_{ch} = 0, ..., Q_{ch} − 1, for each ch = {y, C_0, C_1}
Ψ_{t,C_1,q}^{Q,s} = 0 where q_{ch} = 0, ..., Q_{ch} − 1, for each ch = {y, C_0, C_1}
// STEP 2: scan for each pixel in input image;
compute histogram and sum
for (i = 0 ; i < P ; i ++ ){
```

| | |
|---|---|
| $q_y = \left\lfloor \dfrac{v_{t,i}^y - v_{t,i}^{y,min}}{d_t^y} \right\rfloor;$ | // HDR image's luma quantized value |
| $q_{C_0} = \left\lfloor \dfrac{v_{t,i}^{C_0} - v_{t,i}^{C_0 min}}{d_t^{C_0}} \right\rfloor;$ | // HDR image's chroma 0 quantized value |
| $q_{C_1} = \left\lfloor \dfrac{v_{t,i}^{C_1} - v_{t,i}^{C_1 min}}{d_t^{C_1}} \right\rfloor;$ | // HDR image's chroma 1 quantized value |

```
q = q_y · Q_{C_0} · Q_{C_1} + q_{C_0} · Q_{C_1} + q_{C_1};    // get 1D index
Ω_{t,q}^{Q,v} ++ ;                                            // 3D histogram in HDR image
Ψ_{t,y,q}^{Q,v} = Ψ_{t,y,q}^{Q,v} + v_{t,i}^y;                // HDR image's y values
Ψ_{t,C_0,q}^{Q,v} = Ψ_{t,C_0,q}^{Q,v} + v_{t,i}^{c0};         // HDR image's C_0 values
Ψ_{t,C_1,q}^{Q,v} = Ψ_{t,C_1,q}^{Q,v} + v_{t,i}^{c1};         // HDR image's C_1 values
Ψ_{t,y,q}^{Q,s} = Ψ_{t,y,q}^{Q,s} + s_{t,i}^y;                // SDR image's y values
Ψ_{t,C_0,q}^{Q,s} = Ψ_{t,C_0,q}^{Q,s} + s_{t,i}^{c0};         // SDR image's C_0 values
Ψ_{t,C_1,q}^{Q,s} = Ψ_{t,C_1,q}^{Q,s} + s_{t,i}^{c1};         // SDR image's C_1 values
}
```

The next step is to find the 3D histogram bins that have non-zero number of pixels. In other words, we collect all non-zero entry to set $\Phi_t^Q$. We compute the averages of HDR ($\Psi_{t,y,q}^{Q,v}, \Psi_{t,C_1,q}^{Q,v}, \Psi_{t,C_0,q}^{Q,v}$) and SDR ($\Psi_{t,y,q}^{Q,s}, \Psi_{t,C_1,q}^{Q,s}, \Psi_{t,C_0,q}^{Q,s}$), as outlined below in pseudo code:

```
// initialize
i = 0;
for (q=0; q < Q_y × Q_{C_0} × Q_{C_1}; q++) {
    if(Ω_{t,q}^{Q,v} > 0){
        Φ_t^Q = Φ_t^Q ∪ q;
```

| | |
|---|---|
| $\bar{\Psi}_{t,y,i}^{Q,v} = \dfrac{\Psi_{t,y,q}^{Q,v}}{\Omega_{t,q}^{Q,v}};$ | // Average 3D-Mapping HDR image y values |
| $\bar{\Psi}_{t,C_0,i}^{Q,v} = \dfrac{\Psi_{t,C_0,q}^{Q,v}}{\Omega_{t,q}^{Q,v}};$ | // Average 3D-Mapping HDR image $C_0$ values |
| $\bar{\Psi}_{t,C_1,i}^{Q,v} = \dfrac{\Psi_{t,C_1,q}^{Q,v}}{\Omega_{t,q}^{Q,v}};$ | // Average 3D-Mapping HDR image $C_1$ values |
| $\bar{\Psi}_{t,y,i}^{Q,s} = \dfrac{\Psi_{t,y,q}^{Q,s}}{\Omega_{t,q}^{Q,v}};$ | // Average 3D-Mapping SDR image y values |
| $\bar{\Psi}_{t,C_0,i}^{Q,s} = \dfrac{\Psi_{t,C_0,q}^{Q,s}}{\Omega_{t,q}^{Q,v}};$ | // Average 3D-Mapping SDR image $C_0$ values |
| $\bar{\Psi}_{t,C_1,i}^{Q,s} = \dfrac{\Psi_{t,C_1,q}^{Q,s}}{\Omega_{t,q}^{Q,v}};$ | // Average 3D-Mapping SDR image $C_1$ values |

```
        i ++;
    }
}
```

Let $P_t$ denote the number of elements in $\Phi_t^Q$.

$$\bar{\Psi}_{t,i}^{Q,v} = [\bar{\Psi}_{t,y,i}^{Q,v} \bar{\Psi}_{t,C_0,i}^{Q,v} \bar{\Psi}_{t,C_1,i}^{Q,v}]^T,$$

and $$\bar{\Psi}_{t,i}^{Q,s} = [\bar{\Psi}_{t,y,i}^{Q,s} \bar{\Psi}_{t,C_0,i}^{Q,s} \bar{\Psi}_{t,C_1,i}^{Q,s}]^T.$$

Then, we have the mapping pair $\{\bar{\Psi}_{t,i}^{Q,v}\}$ and $\{\bar{\Psi}_{t,i}^{Q,s}\}$ for elements in $\Phi_t^Q$.

Optimization:

This example of method 700 then applies iterative MMR-based optimization to 3D mapping pairs $\{\bar{\Psi}_{t,q}^{Q,v}\}$ and $\{\bar{\Psi}_{t,q}^{Q,s}\}$ where $q \in \Phi_t^Q$. In forward reshaping, we take all $\bar{\Psi}_{t,q}^{Q,v}$ as input to predict the chroma in $\bar{\Psi}_{t,q}^{Q,s}$ (i.e., $\bar{\Psi}_{t,C_0,q}^{Q,s}$ and $\bar{\Psi}_{t,C_1,q}^{Q,s}$). The predicted (reshaped SDR) values are ($\hat{\Psi}_{t,y,q}^{Q,s}, \hat{\Psi}_{t,C_0,q}^{Q,s,(k)}, \hat{\Psi}_{t,C_1,q}^{Q,s,(k)}$) at the $k^{th}$ iteration. We use these three SDR predicted 3D values as input for the backward reshaping o predict the HDR chroma values ($\hat{\Psi}_{t,C_0,q}^{Q,v,(k)}, \hat{\Psi}_{t,C_1,q}^{Q,v,(k)}$). The predicted values at the $k^{th}$ iteration are ($\hat{\Psi}_{t,C_0,q}^{Q,v,(k)}, \hat{\Psi}_{t,C_1,q}^{Q,v,(k)}$). Note that there are some matrices used in each iteration that will not change and can be pre-computed.

Initialization:

At the first iteration (k=0), we set the corrected input 3D-binned SDR as the original input SDR. i.e., $\tilde{\Psi}_{t,ch,q}^{Q,s} = \bar{\Psi}_{t,ch,q}^{Q,s}$ for all 3 channels (ch=y, c0, and c1).

Denote the MMR expanded form for the $i^{th}$ input HDR entry as $$\bar{v}_{t,i} = [1\, \bar{\Psi}_{t,y,i}^{Q,v} \bar{\Psi}_{t,C_0,i}^{Q,v} \bar{\Psi}_{t,C_1,i}^{Q,v} \ldots \bar{\Psi}_{t,y,i}^{Q,v} \bar{\Psi}_{t,C_0,i}^{Q,v} \\ \ldots (\bar{\Psi}_{t,y,i}^{Q,v})^2 (\bar{\Psi}_{t,C_0,i}^{Q,v})^2 \ldots ]^T.$$

Collect all $P_t$ entries to get an expanded matrix $$V_t = \begin{bmatrix} (\bar{v}_{t,0})^T \\ (\bar{v}_{t,1})^T \\ \vdots \\ (\bar{v}_{t,P_t-1})^T \end{bmatrix}$$

We also define the following matrix, which will be used in coefficient optimization process:

$$B_t^V = V_t^T \cdot V_t$$

We also prepare the input 3D-binned HDR chroma value in vector forms:

$$v_t^{c0} = \begin{bmatrix} \bar{\Psi}_{t,C_0,0}^{Q,v} \\ \bar{\Psi}_{t,C_0,1}^{Q,v} \\ \vdots \\ \bar{\Psi}_{t,C_0,P_t-1}^{Q,v} \end{bmatrix} \text{ and } v_t^{c1} = \begin{bmatrix} \bar{\Psi}_{t,C_1,0}^{Q,v} \\ \bar{\Psi}_{t,C_1,1}^{Q,v} \\ \vdots \\ \bar{\Psi}_{t,C_1,P_t-1}^{Q,v} \end{bmatrix}$$

Note that $v_t^{c0}$, $v_t^{c1}$, $V_t$, $B_t^V$, and $(B_t^V)^{-1}$ will not change during the iteration since they represent the HDR input value. They can be pre-computed and store in memory without re-computing.

Forward Reshaping:

With forward MMR coefficients $m_t^{F,c0,(k)}$ and $m_t^{F,c1,(k)}$ in the c0 and c1 channels, the predicted SDR values at the $k^{th}$ iteration can be found via $$\hat{s}_t^{c0,(k)} = V_t \cdot m_t^{F,c0,(k)},$$

$$\hat{s}_t^{c1,(k)} = V_t \cdot m_t^{F,c1,(k)},$$

where $$\hat{s}_t^{c0,(k)} = \begin{bmatrix} \hat{\Psi}_{t,C_0,0}^{Q,s,(k)} \\ \hat{\Psi}_{t,C_0,1}^{Q,s,(k)} \\ \vdots \\ \hat{\Psi}_{t,C_0,P_t-1}^{Q,s,(k)} \end{bmatrix} \text{ and } \hat{s}_t^{c1,(k)} = \begin{bmatrix} \hat{\Psi}_{t,C_1,0}^{Q,s,(k)} \\ \hat{\Psi}_{t,C_1,1}^{Q,s,(k)} \\ \vdots \\ \hat{\Psi}_{t,C_1,P_t-1}^{Q,s,(k)} \end{bmatrix}.$$

At each iteration, we collect the corrected SDR values from previous iteration as vectors $$\tilde{s}_t^{c0,(k)} = \begin{bmatrix} \tilde{\Psi}_{t,C_0,0}^{Q,s,(k)} \\ \tilde{\Psi}_{t,C_0,1}^{Q,s,(k)} \\ \vdots \\ \tilde{\Psi}_{t,C_0,P_t-1}^{Q,s,(k)} \end{bmatrix} \text{ and } \tilde{s}_t^{c1,(k)} = \begin{bmatrix} \tilde{\Psi}_{t,C_1,0}^{Q,s,(k)} \\ \tilde{\Psi}_{t,C_1,1}^{Q,s,(k)} \\ \vdots \\ \tilde{\Psi}_{t,C_1,P_t-1}^{Q,s,(k)} \end{bmatrix}.$$

These two vectors will be the target values for the forward prediction process to achieve at iteration k. Note that luma predicted value will not change at each iteration.

Define the following two vectors to facilitate the discussion of coefficient optimization:

$$a_t^{V,c0,(k)} = V_t^T \cdot \tilde{s}_t^{c0,(k)}, \text{ and}$$

$$a_t^{V,c1,(k)} = V_t^T \cdot \tilde{s}_t^{c1,(k)}.$$

The goal of coefficient optimization is to find the MMR coefficients to minimize the MSE between the corrected input SDR signal and the predicted SDR signal at iteration k:

$$m_t^{F,c0,(k),opt} = \arg\min \|\hat{s}_t^{c0,(k)} - \tilde{s}_t^{c0,(k)}\|^2 = \arg\min \|V_t \cdot m_t^{F,c0,(k)} - \tilde{s}_t^{c0,(k)}\|^2,$$

$$m_t^{F,c1,(k),opt} = \arg\min \|\hat{s}_t^{c1,(k)} - \tilde{s}_t^{c1,(k)}\|^2 = \arg\min \|V_t \cdot m_t^{F,c1,(k)} - \tilde{s}_t^{c1,(k)}\|^2.$$

The optimal MMR coefficients in forward reshaping can be solved via least squared solution:

$$m_t^{F,c0,(k),opt} = (B_t^V)^{-1} a_t^{V,c0,(k)}$$

$$m_t^{F,c1,(k),opt} = (B_t^V)^{-1} a_t^{V,c1,(k)}$$

The optimal predicted SDR value at iteration k can be expressed as $$\hat{s}_t^{c0,(k)} = V_t \cdot m_t^{F,c0,(k)opt}, \text{ and}$$

$$\hat{s}_t^{c1,(k)} = V_t \cdot m_t^{F,c1,(k)opt}.$$

Backward Reshaping:

At the $k^{th}$ iteration, denote the MMR expanded form for a predicted SDR pixel as $$\bar{s}_{t,i}^{(k)} = [1 \hat{\Psi}_{t,y,i}^{Q,s,(k)} \hat{\Psi}_{t,C_0,i}^{Q,s,(k)} \hat{\Psi}_{t,C_1,i}^{Q,s,(k)} \ldots \\ \hat{\Psi}_{t,y,i}^{Q,s,(k)} \hat{\Psi}_{t,C_0,i}^{Q,s,(k)} \ldots (\hat{\Psi}_{t,y,i}^{Q,s,(k)}) \\ (\hat{\Psi}_{t,C_0,i}^{Q,s,(k)})^2 \qquad \qquad (\hat{\Psi}_{t,y,i}^{Q,s,(k)})^2 \\ (\hat{\Psi}_{t,C_0,i}^{Q,s,(k)})^2 \ldots ]^T.$$

We can collect all P pixels together to construct a matrix $$s_t^{(k)} = \begin{bmatrix} (\bar{s}_{t,0}^{(k)})^T \\ (\bar{s}_{t,1}^{(k)})^T \\ \vdots \\ (\bar{s}_{t,P_t-1}^{(k)})^T \end{bmatrix}.$$

Define the following matrix which will be used in coefficient optimization process:

$$B_t^{S,(k)} = (S_t^{(k)})^T \cdot S_t^{(k)}$$

With backward MMR coefficients $m_t^{B,c0,(k)}$ and $m_t^{B,c0,(k)}$ in the c0 and c1 channels, the predicted HDR values at the $k^{th}$ iteration can be found via $$\hat{v}_t^{c0,(k)} = S_t^{(k)} \cdot m_t^{B,c0,(k)}$$

$$\hat{v}_t^{c1,(k)} = S_t^{(k)} \cdot m_t^{B,c1,(k)}$$

where $$\hat{v}_t^{c0,(k)} = \begin{bmatrix} \hat{\Psi}_{t,C_0,0}^{Q,v,(k)} \\ \hat{\Psi}_{t,C_0,1}^{Q,v,(k)} \\ \vdots \\ \hat{\Psi}_{t,C_0,P_t-1}^{Q,v,(k)} \end{bmatrix} \text{ and } \hat{v}_t^{c1,(k)} = \begin{bmatrix} \hat{\Psi}_{t,C_1,0}^{Q,v,(k)} \\ \hat{\Psi}_{t,C_1,1}^{Q,v,(k)} \\ \vdots \\ \hat{\Psi}_{t,C_1,P_t-1}^{Q,v,(k)} \end{bmatrix}.$$

We also define the following vectors to facilitate the coefficient optimization:

$$a_t^{S,c0,(k)} = (S_t^{(k)})^T \cdot v_t^{c0}$$

$$a_t^{S,c1,(k)} = (S_t^{(k)})^T \cdot v_t^{c1}$$

The optimization goal is to find the MMR coefficients to minimize the MSE between the original input HDR entry and the predicted HDR entry at iteration k:

$$m_t^{B,c0,(k),opt} = \arg\min \|\hat{v}_t^{c0,(k)} - v_t^{c0}\|^2 = \arg\min \|S_t^{(k)} \cdot m_t^{B,c0,(k)} - v_t^{c0}\|^2,$$

$$m_t^{B,c1,(k),opt} = \arg\min \|\hat{v}_t^{c1,(k)} - v_t^{c1}\|^2 = \arg\min \|S_t^{(k)} \cdot m_t^{B,c1,(k)} - v_t^{c1}\|^2.$$

The optimal MMR coefficients in backward reshaping can be found as the least squared solutions:

$$m_t^{B,c0,(k),opt} = (B_t^{s,(k)})^{-1} a_t^{S,c0,(k)}, \text{ and}$$

$$m_t^{B,c1,(k),opt} = (B_t^{s,(k)})^{-1} a_t^{S,c1,(k)}.$$

The predicted HDR values can be expressed as $$\hat{v}_t^{c0,(k)} = S_t^{(k)} \cdot m_t^{B,c0,(k),opt}, \text{ and}$$

$$\hat{v}_t^{c1,(k)} = S_t^{(k)} \cdot m_t^{B,c1,(k),opt}.$$

Iteration Control and Computation of Corrected Input SDR Signal:

At the end of each iteration, based on the reshaped HDR signal and original input HDR signal, we determine the amounts $\Delta\tilde{\Psi}_{t,C_0,i}^{Q,s,(k)}$ and $\Delta\tilde{\Psi}_{t,C_1,i}^{Q,s,(k)}$ by which to correct the input SDR signal $\tilde{\Psi}_{t,C_0,i}^{Q,s,(k+1)}$ and $\tilde{\Psi}_{t,C_1,i}^{Q,s,(k+1)}$. These correction amounts are a function of $\hat{\Psi}_{t,ch,i}^{Q,v,(k)}$ and $\Psi_{t,ch,i}^{Q,v}$:

$$\Delta\tilde{\Psi}_{t,ch,i}^{Q,s,(k)} = \begin{cases} \alpha^{ch}\left(\Psi_{t,ch,i}^{Q,v} - \hat{\Psi}_{t,ch,i}^{Q,v,(k)}\right) & \text{when } \left|\Psi_{t,ch,i}^{Q,v} - \hat{\Psi}_{t,ch,i}^{Q,v,(k)}\right| > \varepsilon \\ 0 & \text{otherwise} \end{cases}.$$

The corrected input SDR value is updated for the next iteration as:

$$\tilde{\Psi}_{t,ch,i}^{Q,s,(k+1)} = \tilde{\Psi}_{t,ch,i}^{Q,s,(k)} + \Delta\tilde{\Psi}_{t,ch,i}^{Q,s,(k)}.$$

Iteration Termination:

Iteration termination is carried out as discussed above in reference to FIG. 2 in section "Mathematical description of one embodiment of method 200".

Example 4: Pixel-Based TPBS Approximation

In the following, we outline one example of method 800.
Initialization:

At the first iteration (k=0), we set the corrected input SDR as the original input SDR, i.e., $\tilde{s}_{t,i}^{ch,(0)} = s_{t,i}^{ch}$ for all 3 channels (ch=y, c0, and c1).
Recall that the TPBS is defined for channel ch at iteration k as $$\hat{s}_{t,i}^{ch,(k)} = f_t^{FTPB,ch,(k)}(v_{t,i}^y, v_{t,i}^{c0}, v_{t,i}^{c1}) = \sum_{k=0}^{D^{ch}-1} m_{t,k}^{F,ch,(k)} \cdot B_{t,k}^{FTPB,ch}(v_{t,i}^y, v_{t,i}^{c0}, c_{t,i}^{c1}),$$

where $B_{t,k}^{FTPB,ch}(v_{t,i}^y, v_{t,j}^{c0}, v_{t,i}^{c1})$ is the forward TPBS basis function, and $m_{t,k}^{F,ch,(k)}$ is the corresponding forward coefficient. With all P pixels in one frame, we can construct the matrix form for the design matrix:

$$V_t^{TPB,ch} = \begin{bmatrix} B_{t,0}^{FTPB,ch}(v_{t,0}^y, v_{t,0}^{c0}, v_{t,0}^{c1}) & B_{t,1}^{FTPB,ch}(v_{t,0}^y, v_{t,0}^{c0}, v_{t,0}^{c1}) & \cdots & B_{t,D^{ch}-1}^{FTPB,ch}(v_{t,0}^y, v_{t,0}^{c0}, v_{t,0}^{c1}) \\ B_{t,0}^{FTPB,ch}(v_{t,1}^y, v_{t,1}^{c0}, v_{t,1}^{c1}) & B_{t,1}^{FTPB,ch}(v_{t,1}^y, v_{t,1}^{c0}, v_{t,1}^{c1}) & \cdots & B_{t,D^{ch}-1}^{FTPB,ch}(v_{t,1}^y, v_{t,1}^{c0}, v_{t,1}^{c1}) \\ \vdots & \vdots & & \vdots \\ B_{t,0}^{FTPB,ch}(v_{t,P-1}^y, v_{t,P-1}^{c0}, v_{t,P-1}^{c1}) & B_{t,1}^{FTPB,ch}(v_{t,P-1}^y, v_{t,P-1}^{c0}, v_{t,P-1}^{c1}) & \cdots & B_{t,D^{ch}-1}^{FTPB,ch}(v_{t,P-1}^y, v_{t,P-1}^{c0}, v_{t,P-1}^{c1}) \end{bmatrix}$$

We can also define the following matrix, which will be used in coefficient optimization process:

$$B_t^{TPB,V,ch} = (V_t^{TPB,ch})^T \cdot V_t^{TPB,ch}.$$

We also prepare the input HDR chroma values in vector form:

$$v_t^{ch} = \begin{bmatrix} v_{t,0}^{ch} \\ v_{t,1}^{ch} \\ \vdots \\ v_{t,P-1}^{ch} \end{bmatrix}.$$

Note that $v_t^{ch}$, $V_t^{TPB,ch}$, $B_t^{TPB,V,ch}$, and $(B_t^{TPB,V,ch})^{-1}$ will not change during the iteration since they represent the HDR input value. They can be pre-computed and store in memory without re-computing.

Forward Reshaping:

With forward TPBS coefficients $m_t^{F,ch,(k)}$ in channel ch, the predicted SDR values at the $k^{th}$ iteration can be found via $$s_t^{ch,(k)} = V_t^{TPB,ch} \cdot m_t^{F,ch,(k)},$$

where $$\hat{s}_t^{ch,(k)} = \begin{bmatrix} \hat{s}_{t,0}^{ch,(k)} \\ \hat{s}_{t,1}^{ch,(k)} \\ \vdots \\ \hat{s}_{t,P-1}^{ch,(k)} \end{bmatrix}.$$

At each iteration, we collect the corrected SDR value from previous iteration as a vector for each channel:

$$\tilde{s}_t^{ch,(k)} = \begin{bmatrix} \tilde{s}_{t,0}^{ch,(k)} \\ \tilde{s}_{t,1}^{ch,(k)} \\ \vdots \\ \tilde{s}_{t,P-1}^{ch,(k)} \end{bmatrix}.$$

These three vectors will be the target value the forward prediction to achieve at iteration k. Define the following vectors for the three channels to facilitate the discussion of coefficient optimization:

$$a_t^{V,ch,(k)} = (V_t^{TPB,ch})^T \cdot \tilde{s}_t^{ch,(k)}.$$

The coefficient optimization goal is to find the TPBS coefficients to minimize the MSE between the corrected input SDR signal and the predicted SDR signal at iteration k. For each channel, we solve the following optimization problem:

$$m_t^{F,ch,(k),opt} = \arg\min \|\hat{s}_t^{ch,(k)} - \tilde{s}_t^{ch,(k)}\|^2 = \arg\min \|v_t^{TPB,ch} \cdot m_t^{F,ch,(k),opt} - \tilde{s}_t^{ch,(k)}\|^2.$$

The optimal TPB coefficients in forward reshaping can be found at the least squared solution:

$$m_t^{F,ch,(k),opt} = (B_t^{TPB,V,ch})^{-1} a_t^{V,ch,(k)}.$$

The optimal predicted SDR value at iteration k can be expressed as $$\hat{s}_t^{ch,(k)} = V_t^{TPB,ch} \cdot m_t^{F,ch,(k),opt}.$$

Backward Reshaping:

At the $k^{ch}$ iteration, denote the predicted TPBS value in HDR as $$\hat{v}_{t,i}^{ch,(k)} =$$

$$f_t^{BTPB,ch}(\hat{s}_{t,i}^{y,(k)}, \hat{s}_{t,i}^{c0,(k)}, \hat{s}_{t,i}^{c1,(k)}) = \sum_{k=0}^{D^{ch}-1} m_{t,k}^{B,ch,(k)} \cdot B_{t,k}^{BTPB,ch}(\hat{s}_{t,i}^{y,(k)}, \hat{s}_{t,i}^{c0,(k)}, \hat{s}_{t,i}^{c1,(k)}),$$

where $B_{t,k}^{BTPB,ch}(\hat{S}_{t,i}^y, \hat{S}_{t,i}^{c0}, \hat{S}_{t,i}^{c0})$ is the backward TPBS basis function, and $m_{t,k}^{B,ch}$ is the corresponding backward coefficient. With all P pixels in one frame, we can construct the matrix form for the design matrix:

$$S_t^{TPB,ch,(k)} = \begin{bmatrix} B_{t,0}^{BTPB,ch}\left(\hat{S}_{t,0}^{y,(k)},\hat{S}_{t,0}^{c0,(k)},\hat{S}_{t,0}^{c1,(k)}\right) & B_{t,1}^{BTPB,ch}\left(\hat{S}_{t,0}^{y,(k)},\hat{S}_{t,0}^{c0,(k)},\hat{S}_{t,0}^{c1,(k)}\right) & \cdots & B_{t,D^{ch}-1}^{BTPB,ch}\left(\hat{S}_{t,0}^{y,(k)},\hat{S}_{t,0}^{c0,(k)},\hat{S}_{t,0}^{c1,(k)}\right) \\ B_{t,0}^{BTPB,ch}\left(\hat{S}_{t,1}^{y,(k)},\hat{S}_{t,1}^{c0,(k)},\hat{S}_{t,1}^{c1,(k)}\right) & B_{t,1}^{BTPB,ch}\left(\hat{S}_{t,1}^{y,(k)},\hat{S}_{t,1}^{c0,(k)},\hat{S}_{t,1}^{c1,(k)}\right) & \cdots & B_{t,D^{ch}-1}^{BTPB,ch}\left(\hat{S}_{t,1}^{y,(k)},\hat{S}_{t,1}^{c0,(k)},\hat{S}_{t,1}^{c1,(k)}\right) \\ \vdots & \vdots & & \vdots \\ B_{t,0}^{BTPB,ch}\left(\hat{S}_{t,P-1}^{y,(k)},\hat{S}_{t,P-1}^{c0,(k)},\hat{S}_{t,P-1}^{c1,(k)}\right) & B_{t,1}^{BTPB,ch}\left(\hat{S}_{t,P-1}^{y,(k)},\hat{S}_{t,P-1}^{c0,(k)},\hat{S}_{t,P-1}^{c1,(k)}\right) & \cdots & B_{t,D^{ch}-1}^{BTPB,ch}\left(\hat{S}_{t,P-1}^{y,(k)},\hat{S}_{t,P-1}^{c0,(k)},\hat{S}_{t,P-1}^{c1,(k)}\right) \end{bmatrix}$$

Define the following matrix which will be used in coefficient optimization process:

$$B_t^{TPB,S,ch,(k)} = S_t^{TPB,ch,(k)T} \cdot S_t^{TPB,ch,(k)}$$

With backward TPBS coefficients $m_t^{B,ch,(k)}$ in channel ch, the predicted HDR values at the $k^{th}$ iteration can be found via $$\hat{v}_t^{ch,(k)} = S_t^{TPB,ch,(k)} \cdot m_t^{B,ch,(k)},$$

where $$\hat{v}_t^{ch,(k)} = \begin{bmatrix} \hat{v}_{t,0}^{ch,(k)} \\ \hat{v}_{t,1}^{ch,(k)} \\ \vdots \\ \hat{v}_{t,P-1}^{ch,(k)} \end{bmatrix}.$$

We also define the following vectors to facilitate the coefficient optimization:

$$a_t^{S,ch,(k)} = (S_t^{TPB,ch,(k)})^T \cdot V_t^{ch}$$

The optimization goal is to find the TPBS coefficients to minimize the MSE between the original input HDR signal and the predicted HDR signal at iteration k:

$$m_t^{B,ch,(k),opt} = \operatorname{argmin} \|\hat{v}_t^{ch,(k)} - v_t^{ch}\|^2 = \operatorname{argmin} \|S_t^{TPB,ch,(k)} \cdot m_t^{B,ch,(k)} - v_t^{ch}\|^2.$$

The optimal MMR coefficients in backward reshaping can be found as the least squared solution:

$$m_t^{B,ch,(k),opt} = (B_t^{TPB,ch,(k)})^{-1} a_t^{S,ch,(k)}$$

The predicted HDR value can be expressed as $$\hat{v}_t^{ch,(k)} = S_t^{TPB,ch,(k)} \cdot m_t^{B,ch,(k),opt}.$$

Iteration Control and Computation of Corrected Input SDR Signal:

At the end of each iteration, based on the reshaped HDR signal and original input HDR signal, we determine the amount $\Delta \tilde{s}_{t,i}^{ch,(k)}$ by which to correct the input SDR signal $\tilde{s}_{t,i}^{ch,(k+1)}$. This correction amount is a function of $\hat{v}_{t,i}^{ch,(k)}$ and $v_{t,i}^{ch}$:

$$\Delta \tilde{s}_{t,i}^{ch,(k)} = \begin{cases} \alpha^{ch}\left(v_{t,i}^{ch} - \hat{v}_{t,i}^{ch,(k)}\right) & \text{when } \left|v_{t,i}^{ch} - \hat{v}_{t,i}^{ch,(k)}\right| > \varepsilon \\ 0 & \text{otherwise} \end{cases}.$$

To avoid too much change in the input SDR signal, we can set a correction upper bound as $$\Delta \tilde{s}_{t,i}^{ch,(k)} = \min(\Delta \tilde{s}_{t,i}^{ch,(k)}, \lambda).$$

The corrected input SDR value is updated for the next iteration as:

$$\tilde{s}_{t,i}^{ch,(k+1)} = \tilde{s}_{t,i}^{ch,(k)} + \Delta \tilde{s}_{t,i}^{ch,(k)}.$$

Iteration Termination:

Iteration termination is carried out as discussed above in reference to FIG. 2 in section "Mathematical description of one embodiment of method 200".

Example 5: 3D-Bin-Based TPBS Approximation

In the following, we outline one example of method 800 modified to be based on processing of 3D-bins. The 3D-binning is the same as in "Example 3: 3D-Bin-Based MMR". Following this 3D-binning procedure, we have mapping pairs $\{\Psi_{t,i}^{Q,v}\}$ and $\{\Psi_{t,i}^{Q,s}\}$ where $i \in \Phi_t^Q$. In forward reshaping, we take all $\Psi_{t,i}^{Q,v}$ as input to predict all channels in $\Psi_{t,i}^{Q,s}$ (i.e., $\Psi_{t,y,i}^{Q,s}, \Psi_{t,C_0,i}^{Q,s}, \Psi_{t,C_1,i}^{Q,s}$). The predicted values are ($\hat{\Psi}_{t,y,i}^{Q,s,(k)}, \hat{\Psi}_{t,C_0,i}^{Q,s,(k)}, \hat{\Psi}_{t,C_1,i}^{Q,s,(k)}$) at the $k^{th}$ iteration. We use these three SDR predicted 3D-binned values as input for the backward reshaping to predict the HDR values ($\Psi_{t,y,i}^{Q,v}, \Psi_{t,C_0,i}^{Q,v}, \Psi_{t,C_1,i}^{Q,v}$). The predicted values at the $k^{th}$ iteration are ($\hat{\Psi}_{t,y,i}^{Q,v,(k)}, \hat{\Psi}_{t,C_0,i}^{Q,v,(k)}, \hat{\Psi}_{t,C_1,i}^{Q,v,(k)}$). Note that there are some matrices used in each iteration that will not change and can be pre-computed.

Initialization:

At the first iteration (k=0), we set the corrected 3D-binned input SDR signal as the original 3D-binned input SDR signal, i.e., $$\tilde{\Psi}_{t,ch,i}^{Q,s} = \overline{\Psi}_{t,ch,i}^{Q,s} \text{ for all 3 channels (ch=y, c0, and c1).}$$

The predicted value is $$\hat{\Psi}_{t,ch,i}^{Q,s,(k)} = f_t^{FTPB,ch,(k)}\left(\overline{\Psi}_{t,y,i}^{Q,v}, \overline{\Psi}_{t,C_0,i}^{Q,v}, \overline{\Psi}_{t,C_1,i}^{Q,v}\right) = \sum_{k=0}^{D^{ch}-1} m_{t,k}^{F,ch,(k)} \cdot B_{t,k}^{FTPB,ch}\left(\overline{\Psi}_{t,y,i}^{Q,v}, \overline{\Psi}_{t,C_0,i}^{Q,v}, \overline{\Psi}_{t,C_1,i}^{Q,v}\right).$$

With all $P_t$ entries in one frame, we can construct the matrix form for the design matrix:

$$V_t^{TPB,ch} = \begin{bmatrix} B_{t,0}^{FTPB,ch}\left(\overline{\Psi}_{t,y,0}^{Q,v}, \overline{\Psi}_{t,C_0,0}^{Q,v}, \overline{\Psi}_{t,C_1,0}^{Q,v}\right) & B_{t,1}^{FTPB,ch}\left(\overline{\Psi}_{t,y,0}^{Q,v}, \overline{\Psi}_{t,C_0,0}^{Q,v}, \overline{\Psi}_{t,C_1,0}^{Q,v}\right) & \cdots & B_{t,D^{ch}-1}^{FTPB,ch}\left(\overline{\Psi}_{t,y,0}^{Q,v}, \overline{\Psi}_{t,C_0,0}^{Q,v}, \overline{\Psi}_{t,C_1,0}^{Q,v}\right) \\ B_{t,0}^{FTPB,ch}\left(\overline{\Psi}_{t,y,1}^{Q,v}, \overline{\Psi}_{t,C_0,1}^{Q,v}, \overline{\Psi}_{t,C_1,1}^{Q,v}\right) & B_{t,1}^{FTPB,ch}\left(\overline{\Psi}_{t,y,1}^{Q,v}, \overline{\Psi}_{t,C_0,1}^{Q,v}, \overline{\Psi}_{t,C_1,1}^{Q,v}\right) & \cdots & B_{t,D^{ch}-1}^{FTPB,ch}\left(\overline{\Psi}_{t,y,1}^{Q,v}, \overline{\Psi}_{t,C_0,1}^{Q,v}, \overline{\Psi}_{t,C_1,1}^{Q,v}\right) \\ \vdots & \vdots & & \vdots \\ B_{t,0}^{FTPB,ch}\left(\overline{\Psi}_{t,y,P_t-1}^{Q,v}, \overline{\Psi}_{t,C_0,P_t-1}^{Q,v}, \overline{\Psi}_{t,C_1,P_t-1}^{Q,v}\right) & B_{t,1}^{FTPB,ch}\left(\overline{\Psi}_{t,y,P_t-1}^{Q,v}, \overline{\Psi}_{t,C_0,P_t-1}^{Q,v}, \overline{\Psi}_{t,C_1,P_t-1}^{Q,v}\right) & \cdots & B_{t,D^{ch}-1}^{FTPB,ch}\left(\overline{\Psi}_{t,y,P_t-1}^{Q,v}, \overline{\Psi}_{t,C_0,P_t-1}^{Q,v}, \overline{\Psi}_{t,C_1,P_t-1}^{Q,v}\right) \end{bmatrix}$$

We can also define the following matrix, which will be used in the coefficient optimization process:

$$B_t^{TPB,V,ch} = (V_t^{TPB,ch})^T \cdot V_t^{TPB,ch}$$

We also prepare the input HDR ch channel in vector forms:

$$v_t^{ch} = \begin{bmatrix} \Psi_{t,ch,0}^{Q,v} \\ \Psi_{t,ch,1}^{Q,v} \\ \vdots \\ \Psi_{t,ch,P_t-1}^{Q,v} \end{bmatrix}$$

Note that $v_t^{ch}$, $V_t^{TPB,ch}$, $B_t^{TPB,V,ch}$, and $(B_t^{TPB,V,ch})^{-1}$ will not change during the iteration since they represent the input HDR value. They can be pre-computed and store in memory without re-computing.

Forward Reshaping:

With forward TPBS coefficients $m_t^{F,ch,(k)}$, in channel ch, the predicted SDR values at the $k^{th}$ iteration can be found via $$\hat{s}_t^{ch,(k)} = V_t^{TPB,ch} \cdot m_t^{F,ch,(k)},$$

$$S_t^{TPB,ch,(k)} = \begin{bmatrix} B_{t,0}^{BTPB,ch}(\hat{\Psi}_{t,y,0}^{Q,s,(k)}, \hat{\Psi}_{t,C_0,0}^{Q,s,(k)}, \hat{\Psi}_{t,C_1,0}^{Q,s,(k)}) & B_{t,1}^{BTPB,ch}(\hat{\Psi}_{t,y,0}^{Q,s,(k)}, \hat{\Psi}_{t,C_0,0}^{Q,s,(k)}, \hat{\Psi}_{t,C_1,0}^{Q,s,(k)}) & \cdots & B_{t,D^{ch}-1}^{BTPB,ch}(\hat{\Psi}_{t,y,0}^{Q,s,(k)}, \hat{\Psi}_{t,C_0,0}^{Q,s,(k)}, \hat{\Psi}_{t,C_1,0}^{Q,s,(k)}) \\ B_{t,0}^{BTPB,ch}(\hat{\Psi}_{t,y,1}^{Q,s,(k)}, \hat{\Psi}_{t,C_0,1}^{Q,s,(k)}, \hat{\Psi}_{t,C_1,1}^{Q,s,(k)}) & B_{t,1}^{BTPB,ch}(\hat{\Psi}_{t,y,1}^{Q,s,(k)}, \hat{\Psi}_{t,C_0,1}^{Q,s,(k)}, \hat{\Psi}_{t,C_1,1}^{Q,s,(k)}) & \cdots & B_{t,D^{ch}-1}^{BTPB,ch}(\hat{\Psi}_{t,y,1}^{Q,s,(k)}, \hat{\Psi}_{t,C_0,1}^{Q,s,(k)}, \hat{\Psi}_{t,C_1,1}^{Q,s,(k)}) \\ \vdots & \vdots & & \vdots \\ B_{t,0}^{BTPB,ch}(\hat{\Psi}_{t,y,P_t-1}^{Q,s,(k)}, \hat{\Psi}_{t,C_0,P_t-1}^{Q,s,(k)}, \hat{\Psi}_{t,C_1,P_t-1}^{Q,s,(k)}) & B_{t,1}^{BTPB,ch}(\hat{\Psi}_{t,y,P_t-1}^{Q,s,(k)}, \hat{\Psi}_{t,C_0,P_t-1}^{Q,s,(k)}, \hat{\Psi}_{t,C_1,P_t-1}^{Q,s,(k)}) & \cdots & B_{t,D^{ch}-1}^{BTPB,ch}(\hat{\Psi}_{t,y,P_t-1}^{Q,s,(k)}, \hat{\Psi}_{t,C_0,P_t-1}^{Q,s,(k)}, \hat{\Psi}_{t,C_1,P_t-1}^{Q,s,(k)}) \end{bmatrix}$$

where $$\hat{s}_t^{ch,(k)} = \begin{bmatrix} \hat{\Psi}_{t,ch,0}^{Q,s,(k)} \\ \hat{\Psi}_{t,ch,1}^{Q,s,(k)} \\ \vdots \\ \hat{\Psi}_{t,ch,P_t-1}^{Q,s,(k)} \end{bmatrix}.$$

At each iteration, we collect the corrected SDR value from previous iteration as a vector $$\tilde{s}_t^{ch,(k)} = \begin{bmatrix} \tilde{\Psi}_{t,ch,0}^{Q,s,(k)} \\ \tilde{\Psi}_{t,ch,1}^{Q,s,(k)} \\ \vdots \\ \tilde{\Psi}_{t,ch,P_t-1}^{Q,s,(k)} \end{bmatrix}.$$

These three vectors will be the target values for the forward prediction to achieve at iteration k. Define the following vectors for the three channels to facilitate the discussion of coefficient optimization:

$$a_t^{TPB,V,ch,(k)} = (V_t^{TPB,ch})^T \cdot \tilde{s}_t^{ch,(k)}.$$

The coefficient optimization goal is to find the TPBS coefficients to minimize the MSE between the corrected input SDR signal and the predicted SDR signal at iteration k:

$$m_t^{F,ch,(k),opt} = \arg\min \|\hat{s}_t^{ch,(k)} - \tilde{s}_t^{ch,(k)}\|^2 = \arg\min \|V_t^{TPB,ch} \cdot m_t^{F,ch,(k)} - \tilde{s}_t^{ch,(k)}\|^2.$$

The optimal TPBS coefficients in forward reshaping can be found as the least squared solution:

$$m_t^{F,ch,(k),opt} = (B_t^{TPB,V,ch})^{-1} a_t^{TPB,V,ch,(k)}.$$

The optimal predicted SDR value at iteration k can be expressed as $$\hat{s}_t^{ch,(k)} = V_t^{TPB,ch} \cdot m_t^{F,ch,(k),opt}.$$

Backward Reshaping:

At the $k^{th}$ iteration, denote the predicted TPB value in HDR as $$\hat{\Psi}_{t,ch,i}^{Q,v,(k)} = f_t^{BTPB,ch}\left(\hat{\Psi}_{t,y,i}^{Q,s,(k)}, \hat{\Psi}_{t,C_0,i}^{Q,s,(k)}, \hat{\Psi}_{t,C_1,i}^{Q,s,(k)}\right) = \sum_{k=0}^{D^{ch}-1} m_{t,k}^{B,ch,(k)} \cdot B_{t,k}^{BTPB,ch}\left(\hat{\Psi}_{t,y,i}^{Q,s,(k)}, \hat{\Psi}_{t,C_0,i}^{Q,s,(k)}, \hat{\Psi}_{t,C_1,i}^{Q,s,(k)}\right),$$

where $B_{t,k}^{BTPB,ch}(\hat{\Psi}_{t,y,i}^{Q,s,(k)}, \hat{\Psi}_{t,C_0,i}^{Q,s,(k)}, \hat{\Psi}_{t,C_1,i}^{Q,s,(k)})$ is the backward TPBS basis function, and $m_{t,k}^{B,ch}$ is the corresponding backward coefficient. With all $P_t$ entries in one frame, we can construct the matrix form for the design matrix:

Define the following matrix which will be used in coefficient optimization process:

$$B_t^{TPB,S,ch,(k)} = (S_t^{TPB,ch,(k)})^T \cdot S_t^{TPB,ch,(k)}.$$

With backward TPBS coefficients $m_t^{B,ch,(k)}$ in channel ch, the predicted HDR values at the $k^{th}$ iteration can be found via $$\hat{v}_t^{ch,(k)} = S_t^{TPB,ch,(k)} \cdot m_t^{B,ch,(k)}.$$

where $$\hat{v}_t^{ch,(k)} = \begin{bmatrix} \hat{\Psi}_{t,ch,0}^{Q,v,(k)} \\ \hat{\Psi}_{t,ch,1}^{Q,v,(k)} \\ \vdots \\ \hat{\Psi}_{t,ch,P_t-1}^{Q,v,(k)} \end{bmatrix}.$$

We also define the following vectors to facilitate the coefficient optimization:

$$a_t^{S,ch,(k)} = (S_t^{TPB,ch,(k)})^T \cdot v_t^{ch}$$

The optimization goal is to find the TPBS coefficients to minimize the MSE between the original input HDR signal and the predicted HDR signal at iteration k:

$$m_t^{B,ch,(k),opt} = \arg\min \|\hat{v}_t^{ch,(k)} - v_t^{ch}\|^2 = \arg\min \|S_t^{TPB,ch,(k)} \cdot m_t^{B,ch,(k)} - v_t^{ch}\|^2$$

The optimal TPBS coefficients in backward reshaping can be solved via least squared solution:

$$m_t^{B,ch,(k),opt} = (B_t^{TPB,S,ch,(k)})^{-1} a_t^{S,ch,(k)}$$

The predicted HDR value can be expressed as $$\hat{v}_t^{ch,(k)} = S_t^{TPB,ch,(k)} \cdot m_t^{B,ch,(k),opt}.$$

Iteration Control and Computation of Corrected Input SDR Signal:

At the end of each iteration, based on the reshaped HDR signal and original input HDR signal, we determine the amount $\Delta \tilde{\Psi}_{t,ch,i}^{Q,s,(k)}$ by which to correct the input SDR signal $\tilde{\Psi}_{t,ch,i}^{Q,s,(k+1)}$. This correction amount is a function of $\hat{\Psi}_{t,ch,i}^{Q,v,(k)}$ and $\Psi_{t,ch,i}^{Q,v}$:

$$\Delta \tilde{\Psi}_{t,ch,i}^{Q,s,(k)} = \begin{cases} \alpha^{ch}\left(\Psi_{t,ch,i}^{Q,v} - \hat{\Psi}_{t,ch,i}^{Q,v,(k)}\right) & \text{when } \left|\Psi_{t,ch,i}^{Q,v} - \hat{\Psi}_{t,ch,i}^{Q,v,(k)}\right| > \varepsilon \\ 0 & \text{otherwise} \end{cases}$$

The corrected input SDR value is updated for the next iteration as:

$$\tilde{\Psi}_{t,ch,i}^{Q,s,(k+1)} = \tilde{\Psi}_{t,ch,i}^{Q,s,(k)} + \Delta \tilde{\Psi}_{t,ch,i}^{Q,s,(k)}.$$

Iteration Termination:

Iteration termination is carried out as discussed above in reference to FIG. 2 in section "Mathematical description of one embodiment of method 200".

Combinations of Features

Features described above as well as those claimed below may be combined in various ways without departing from the scope hereof. For example, it will be appreciated that aspects of one image reshaping method or product, described herein, may incorporate or swap features of another image reshaping method or product described herein. The following examples illustrate some possible, non-limiting combinations of embodiments described above. It should be clear that many other changes and modifications may be made to the methods, products, and systems herein without departing from the spirit and scope of this invention:

(A1) One method, for generating (a) a forward reshaping function for compressing an input high-dynamic range (HDR) image into a reshaped standard-dynamic-range (SDR) image and (b) a backward reshaping function for decompressing the reshaped SDR image into a reconstructed HDR image, includes (i) optimizing the forward reshaping function to minimize a deviation between the reshaped SDR image and an input SDR image corresponding to the input HDR image, (ii) optimizing the backward reshaping function to minimize a deviation between the reconstructed HDR image and the input HDR image, and (iii) until a termination condition is met, applying a correction to the input SDR image and reiterating, based on the input SDR image as corrected, the steps of optimizing the forward and backward reshaping functions.

(A2) In the method denoted as (A1), the step of applying the correction may include applying, to each pixel of each of one or more color-component channels of the input SDR image, a deviation-based correction value that is proportional to the deviation between the reconstructed HDR image and the input HDR image for a corresponding pixel and a corresponding color-component channel, at least as long as the deviation-based correction value is less than a predefined maximum correction value.

(A3) In the method denoted as (A2), for each pixel of each of the one or more color-component channels of the input SDR image, the deviation-based correction value may be proportional to the deviation between the reconstructed HDR image and the input HDR image for a corresponding pixel and a corresponding color-component channel.

(A4) In either of the methods denoted as (A2) and (A3), the termination condition may, at least until reaching a predefined maximum number of iterations of the steps of optimizing the forward and backward reshaping functions, be that a deviation measure at least between the reconstructed HDR image and the input HDR image is no greater than a threshold amount.

(A5) In the method denoted as (A4), the deviation measure may be a weighted combination of (i) the deviation between the reconstructed HDR image and the input HDR image and (ii) a deviation between the reshaped SDR image and the input SDR image.

(A6) In either of the methods denoted as (A4) and (A5), the deviation measure may be based on only a subset of the color-component channels defining each of the input SDR and input HDR images.

(A7) In the method denoted as (A6), the color-component channels may include a luma channel and two chroma channels, and the subset may be the luma channel.

(A8) In the method denoted as (A6), the color-component channels may include a luma channel and two chroma channels, and the subset may be the two chroma channels.

(A9) In any of the methods denoted as (A1) through (A8), the step of optimizing the backward reshaping function may include applying the backward reshaping function to the reshaped SDR image as generated by the optimized forward reshaping function.

(A10) In any of the methods denoted as (A1) through (A9), the steps of optimizing the forward reshaping function and applying a correction to the input SDR image may utilize a local copy of the input SDR image, and the method may further include maintaining an uncorrected version of the input SDR image.

(A11) Any of the methods denoted as (A1) through (A10) may include performing the steps of optimizing the forward reshaping function and optimizing the backward reshaping function for each of a plurality of color-component channels.

(A12) In the method denoted as (A11), the color-component channels may include a luma channel, a first chroma channel, and a second chroma channel, wherein (a) for the luma channel, the method optimizes the forward and backward reshaping functions in only a single iteration of the steps of optimizing the forward and backward reshaping functions, and (b) for each of the first and second chroma channels, the steps of optimizing the forward and backward reshaping functions utilize multivariate multiple regression.

(A13) A method for encoding an HDR image may include performing any of the methods denoted as (A1) through (A12) to generate an iteratively optimized forward reshaping function and an iteratively optimized backward reshaping function, after receiving the input HDR image and the input SDR image. The method may further include outputting (i) the reshaped SDR image generated in a last iteration of the step of optimizing the forward reshaping function and (ii) parameters characterizing the backward reshaping function as optimized in a last iteration of the step of optimizing the backward reshaping function.

(B1) One software product, for generating (a) a forward reshaping function for compressing an input high-dynamic range (HDR) image into a reshaped standard-dynamic-range (SDR) image and (b) a backward reshaping function for decompressing the reshaped SDR image into a reconstructed HDR image, includes non-transitory, computer-readable media storing machine-readable instructions. The instructions include (i) forward optimization instructions that, when executed by a processor, cause the processor to optimize the forward reshaping function to minimize a deviation between the reshaped SDR image and an input SDR image corresponding to the input HDR image, (ii) backward optimization instructions that, when executed by the processor, cause the processor to optimize the backward reshaping function to minimize deviation between the reconstructed HDR image and the input HDR image, (iii) SDR-image correction instructions that, when executed by the processor, cause the processor to apply a correction to the input SDR image, and (iv) iteration control instructions that, when executed by the processor, cause the processor to evaluate if a termination condition has been met and, as long as the termination condition has not been met, execute the SDR image correction instructions and re-execute the forward optimization instructions and the backward optimization instructions based on the input SDR image as corrected.

(B2) In the software product denoted as (B1), the SDR-image correction instructions may be configured to, when executed by the processor, cause the processor to apply, to each pixel of each of one or more color-component channels of the input SDR image, a deviation-based correction value that is proportional to a deviation between the reconstructed HDR image and the input HDR image for a corresponding pixel and a corresponding color-component channel.

(B3) In either of the software products denoted as (B1) and (B2), the termination condition may include a threshold amount, and the iteration control instructions may be configured to, when executed by the processor, cause the processor to evaluate if a deviation measure at least between the reconstructed HDR image and the input HDR image is less than the threshold amount.

(B4) In the software product denoted as (B3), the termination condition may further include a maximum iteration number, and the iteration control instructions may be configured to, when executed by the processor, cause the processor to, if the maximum iteration number has been reached, (a) stop re-execution of the SDR-image correction instructions, the forward optimization instructions, and the backward optimization instructions, and (b) output parameters characterizing the backward reshaping function and output the reshaped SDR image.

(B5) In either of the software products denoted as (B3) and (B4), the deviation measure may be a weighted combination of (i) the deviation between the reconstructed HDR image and the input HDR image and (ii) a deviation between the reshaped SDR image and the input SDR image.

(B6) An encoder may include any of the software products denoted as (B1) through (B5), a processor for executing the machine-readable instructions of the software product, an input interface for receiving the input HDR image and the input SDR image, and an output interface for outputting (i) the reshaped SDR image generated using the forward reshaping function as optimized, and (ii) parameters characterizing the backward reshaping function as optimized.

Changes may be made in the above systems, products, and methods without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present systems, products, and methods, which, as a matter of language, might be said to fall therebetween.

The invention claimed is:

1. A method for generating (a) a forward reshaping function for compressing an input high-dynamic range (HDR) image into a reshaped standard-dynamic-range (SDR) image and (b) a backward reshaping function for decompressing the reshaped SDR image into a reconstructed HDR image, comprising:

optimizing the forward reshaping function to minimize a deviation between the reshaped SDR image and an input SDR image corresponding to the input HDR image;

optimizing the backward reshaping function to minimize a deviation between the reconstructed HDR image and the input HDR image; and until a termination condition is met:
applying a correction to the input SDR image, and
reiterating, based on the input SDR image as corrected, the steps of optimizing the forward and backward reshaping functions.

2. The method of claim 1, wherein the step of applying the correction comprises:

applying, to each pixel of each of one or more color-component channels of the input SDR image, a deviation-based correction value that is proportional to the deviation between the reconstructed HDR image and the input HDR image for a corresponding pixel and a corresponding color-component channel.

3. The method of claim 2, the deviation-based correction value is limited to be less than a predefined maximum correction value.

4. The method of claim 2, at least until reaching a predefined maximum number of iterations of the steps of optimizing the forward and backward reshaping functions, the termination condition being that a deviation measure at least between the reconstructed HDR image and the input HDR image is no greater than a threshold amount.

5. The method of claim 4, the deviation measure being a weighted combination of (i) the deviation between the reconstructed HDR image and the input HDR image and (ii) a deviation between the reshaped SDR image and the input SDR image.

6. The method of claim 4, the deviation measure being based on only a subset of the color-component channels defining each of the input SDR and input HDR images.

7. The method of claim 6, the color-component channels including a luma channel and two chroma channels, the subset being the luma channel.

8. The method of claim 6, the color-component channels including a luma channel and two chroma channels, the subset being the two chroma channels.

9. The method of claim 1, the step of optimizing the backward reshaping function comprising applying the backward reshaping function to the reshaped SDR image as generated by the optimized forward reshaping function.

10. The method of claim 1, the steps of optimizing the forward reshaping function and applying a correction to the input SDR image utilizing a local copy of the input SDR image, the method further comprising maintaining an uncorrected version of the input SDR image.

11. The method of claim 1, comprising performing the steps of optimizing the forward reshaping function and optimizing the backward reshaping function for each of a plurality of color-component channels.

12. The method of claim 11, the color-component channels including a luma channel, a first chroma channel, and a second chroma channel, wherein:

for the luma channel, the method optimizes the forward and backward reshaping functions in only a single iteration of the steps of optimizing the forward and backward reshaping functions; and for each of the first and second chroma channels, the steps of optimizing the forward and backward reshaping functions utilize multivariate multiple regression.

13. A method for encoding an HDR image, comprising:
performing the method of claim 1 to generate an iteratively optimized forward reshaping function and an iteratively optimized backward reshaping function;
prior to performing the method of claim 1, receiving the input HDR image and the input SDR image; and
after performing the method of claim 1, outputting (i) the reshaped SDR image generated in a last iteration of the step of optimizing the forward reshaping function and (ii) parameters characterizing the backward reshaping function as optimized in a last iteration of the step of optimizing the backward reshaping function.

14. A non-transitory computer readable medium storing program instructions which cause a computing device or a system to perform the method according to claim 1.

15. An encoder comprising:
a non-transitory computer readable medium storing the computer program of claim 14;
a processor for executing the computer program;
an input interface for receiving the input HDR image and the input SDR image; and
an output interface for outputting (i) the reshaped SDR image generated using the forward reshaping function as optimized, and (ii) parameters characterizing the backward reshaping function as optimized.

* * * * *